(12) United States Patent
Nagai et al.

(10) Patent No.: US 9,515,509 B2
(45) Date of Patent: Dec. 6, 2016

(54) ELECTRONIC DEVICE SYSTEM AND BATTERY PACK

(71) Applicant: SONY CORPORATION, Tokyo (JP)

(72) Inventors: Hiroki Nagai, Nagano (JP); Yosuke Kubo, Nagano (JP); Kiyotaka Akasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 13/951,071

(22) Filed: Jul. 25, 2013

(65) Prior Publication Data

US 2014/0055097 A1    Feb. 27, 2014

(30) Foreign Application Priority Data

Aug. 24, 2012  (JP) .................................. 2012-184851

(51) Int. Cl.
| | |
|---|---|
| H02J 7/00 | (2006.01) |
| G08B 21/00 | (2006.01) |
| H01M 10/44 | (2006.01) |
| H02J 7/04 | (2006.01) |

(52) U.S. Cl.
CPC .............. *H02J 7/007* (2013.01); *H02J 7/0014* (2013.01); *H02J 7/0063* (2013.01); *H02J 7/045* (2013.01); *H02J 7/047* (2013.01); *G08B 21/00* (2013.01); *H01M 10/44* (2013.01); *H01M 2220/00* (2013.01); *H02J 2007/0067* (2013.01)

(58) Field of Classification Search
CPC .............. H02J 7/00; H02J 7/07; H02J 7/0014; H02J 7/0063; H02J 7/045; H02J 7/047; H02J 2007/0067; B01N 27/416; G08B 21/00; H01M 10/44; H01M 2220/00
USPC  320/134, 112, 124, 128, 135, 136; 324/428, 435; 340/636.19, 636.2
See application file for complete search history.

(56) References Cited

U.S. PATENT DOCUMENTS

| | | | | | |
|---|---|---|---|---|---|
| 5,280,231 | A | * | 1/1994 | Kato et al. | ....................... 322/28 |
| 5,514,946 | A | * | 5/1996 | Lin et al. | ......................... 702/63 |
| 5,539,298 | A | * | 7/1996 | Perkins et al. | ................ 320/139 |
| 5,962,157 | A | * | 10/1999 | Kang | ................ H01M 10/4257 429/62 |

(Continued)

FOREIGN PATENT DOCUMENTS

| | | | | | |
|---|---|---|---|---|---|
| JP | 08140205 | A | * | 5/1996 | ................ B60L 3/00 |
| JP | 2001217012 | A | * | 8/2001 | ............ H01M 10/46 |

(Continued)

OTHER PUBLICATIONS

Cui, Chinese Patent Document No. CN 101383516 A, Published Mar. 11, 2009, 3 pages.*

*Primary Examiner* — Phallaka Kik
(74) *Attorney, Agent, or Firm* — Paratus Law Group, PLLC

(57) ABSTRACT

There is provided an electronic device system including a plurality of battery packs, and an electronic device that is driven by a power source supplied from the battery packs. At least one battery pack of the plurality of battery packs outputs one or both of discharge information indicating whether the battery pack is dischargeable and charge information indicating whether the battery pack is chargeable, and the electronic device includes a control unit that performs one or both of control of discharge of the battery pack based on the discharge information and control of charge of the battery pack based on the charge information.

28 Claims, 10 Drawing Sheets

(56) References Cited

U.S. PATENT DOCUMENTS

| | | | |
|---|---|---|---|
| 6,326,767 B1* | 12/2001 | Small | H01M 2/1055 320/116 |
| 6,532,152 B1* | 3/2003 | White | G02F 1/133308 312/223.1 |
| 8,704,485 B1* | 4/2014 | Tsukamoto | H01M 10/44 320/112 |
| 2008/0315846 A1* | 12/2008 | Sato | H02J 7/0073 320/164 |
| 2009/0258282 A1* | 10/2009 | Harada | H01M 10/625 429/61 |
| 2010/0085008 A1* | 4/2010 | Suzuki | B25F 5/00 320/112 |
| 2010/0106631 A1* | 4/2010 | Kurayama | B60L 11/1816 705/34 |
| 2010/0129700 A1* | 5/2010 | Tanno | H01M 10/441 429/93 |
| 2010/0308771 A1* | 12/2010 | Densham | H01M 10/441 320/134 |
| 2011/0074350 A1* | 3/2011 | Kocher | 320/109 |
| 2011/0084667 A1* | 4/2011 | Li | H02J 7/0073 320/145 |
| 2011/0221384 A1* | 9/2011 | Scheucher | 320/101 |
| 2012/0091965 A1* | 4/2012 | Seo | G06F 1/26 320/128 |
| 2012/0095772 A1* | 4/2012 | Asai | H01M 10/48 705/1.1 |
| 2012/0105001 A1* | 5/2012 | Gallegos | B60L 3/0046 320/109 |
| 2012/0169290 A1* | 7/2012 | Nakashima | H01M 10/44 320/134 |
| 2012/0249048 A1* | 10/2012 | Nishibayashi | H01M 10/482 320/101 |
| 2012/0305662 A1* | 12/2012 | Miyano | H02J 7/00 236/44 C |
| 2013/0049675 A1* | 2/2013 | Minami | H02J 7/0054 320/103 |
| 2013/0085696 A1* | 4/2013 | Xu et al. | 702/63 |
| 2013/0103333 A1* | 4/2013 | Nishida | H01M 10/482 702/63 |
| 2013/0113436 A1* | 5/2013 | Ishibashi | H02J 7/0013 320/136 |
| 2013/0154569 A1* | 6/2013 | Endo | H02J 7/0014 320/128 |
| 2013/0307475 A1* | 11/2013 | Kishiyama | H02J 7/0027 320/109 |
| 2013/0307480 A1* | 11/2013 | Boggs | B60L 3/00 320/118 |
| 2014/0012447 A1* | 1/2014 | Gao | B60L 11/1874 701/22 |

FOREIGN PATENT DOCUMENTS

| | | | | |
|---|---|---|---|---|
| JP | 2007228657 A | * | 9/2007 | B60L 3/00 |
| JP | 2009-124795 | | 6/2009 | |
| JP | 2012069451 A | * | 4/2012 | G01R 31/36 |

* cited by examiner

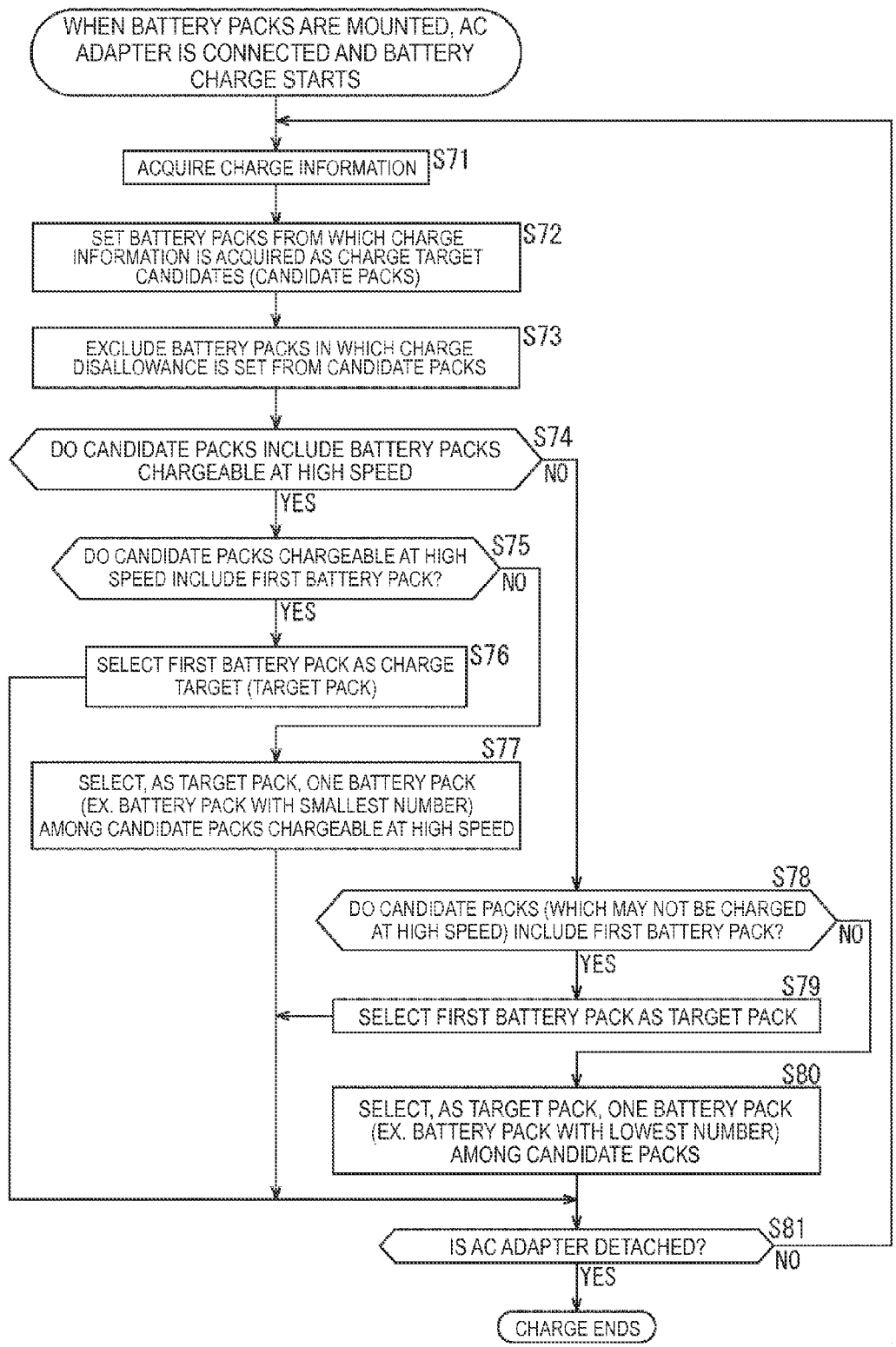

FIG. 10

| CHARGE INFORMATION REGARDING FIRST BATTERY PACK | CHARGE INFORMATION REGARDING SECOND BATTERY PACK | TARGET PACK |
|---|---|---|
| CHARGE DISALLOWANCE | CHARGE DISALLOWANCE | NO CHARGE |
| HIGH-SPEED CHARGE ALLOWANCE | CHARGE DISALLOWANCE | FIRST BATTERY PACK |
| HIGH-SPEED CHARGE DISALLOWANCE | CHARGE DISALLOWANCE | FIRST BATTERY PACK |
| CHARGE DISALLOWANCE | HIGH-SPEED CHARGE ALLOWANCE | SECOND BATTERY PACK |
| HIGH-SPEED CHARGE ALLOWANCE | HIGH-SPEED CHARGE ALLOWANCE | FIRST BATTERY PACK |
| HIGH-SPEED CHARGE DISALLOWANCE | HIGH-SPEED CHARGE ALLOWANCE | SECOND BATTERY PACK |
| CHARGE DISALLOWANCE | HIGH-SPEED CHARGE DISALLOWANCE | SECOND BATTERY PACK |
| HIGH-SPEED CHARGE ALLOWANCE | HIGH-SPEED CHARGE DISALLOWANCE | FIRST BATTERY PACK |
| HIGH-SPEED CHARGE DISALLOWANCE | HIGH-SPEED CHARGE DISALLOWANCE | FIRST BATTERY PACK |

ELECTRONIC DEVICE SYSTEM AND BATTERY PACK

BACKGROUND

The present technology relates to an electronic device system and a battery pack, and more particularly, to an electronic device system and a battery pack, for example, in the electronic device system on which a plurality of battery packs are mounted and which is capable of appropriately discharging or charging the battery packs.

In an electronic device system in which a battery pack is mounted on an electronic device capable of mounting a battery back, driving can be performed by receiving power from the battery pack rather than receiving power from an outlet.

In recent years, electronic devices capable of mounting a plurality of battery packs have been suggested, for example, so that the electronic devices can be driven for a long time by a battery pack.

As electronic device systems on which a plurality of battery packs can be mounted on electronic devices, for example, dual battery systems on which two battery packs are mounted have been suggested. Examples of the dual battery systems (electronic devices serving as dual battery systems) include portable devices such as note-type personal computers (PCs) and tablet terminals.

Further, in regard to a plurality of battery packs, methods of efficiently charging the plurality of battery packs have been suggested (for example, Japanese Unexamined Patent Application Publication No. 2009-124795).

SUMMARY

In an electronic device system on which a plurality of battery packs are mounted, such as a dual battery system, it is necessary to control discharge or charge so that the discharge or charge of the battery packs can be appropriately performed on the plurality of battery packs.

It is desirable to provide a technology for appropriately discharging or charging a plurality of battery packs in an electronic device system on which the plurality of battery packs can be mounted.

According to a first embodiment of the present technology, there is provided an electronic device system including a plurality of battery packs, and an electronic device that is driven by a power source supplied from the battery packs. At least one battery pack of the plurality of battery packs outputs one or both of discharge information indicating whether the battery pack is dischargeable and charge information indicating whether the battery pack is chargeable, and the electronic device includes a control unit that performs one or both of control of discharge of the battery pack based on the discharge information and control of charge of the battery pack based on the charge information.

In the above-described first embodiment of the present technology, of the plurality of battery packs, at least one battery pack outputs one or both of the discharge information indicating whether the battery pack is dischargeable and the charge information indicating whether the battery pack is chargeable. The electronic device performs one or both of the control of the discharge of the battery pack based on the discharge information and the control of the charge of the battery pack based on the charge information.

According to a second embodiment of the present technology, there is provided a battery pack that outputs charge information indicating whether charge is possible.

In the above-described second embodiment of the present technology, the battery pack outputs the charge information indicating whether the battery pack is chargeable.

According to a third embodiment of the present technology, there is provided a battery pack that outputs discharge information indicating whether discharge is possible.

In the above-described third embodiment of the present technology, the battery pack outputs the discharge information indicating whether the discharge is possible.

According to the first to third embodiments of the present technology, it is possible to appropriately discharge or charge a plurality of battery packs in an electronic device system capable on which the plurality of battery packs are mounted.

BRIEF DESCRIPTION OF THE DRAWINGS

FIG. 9 is a flowchart illustrating control of charge; and

FIG. 10 is a diagram illustrating battery packs selected as charge targets under the control of the charge.

DETAILED DESCRIPTION OF THE EMBODIMENTS

Figure 1:
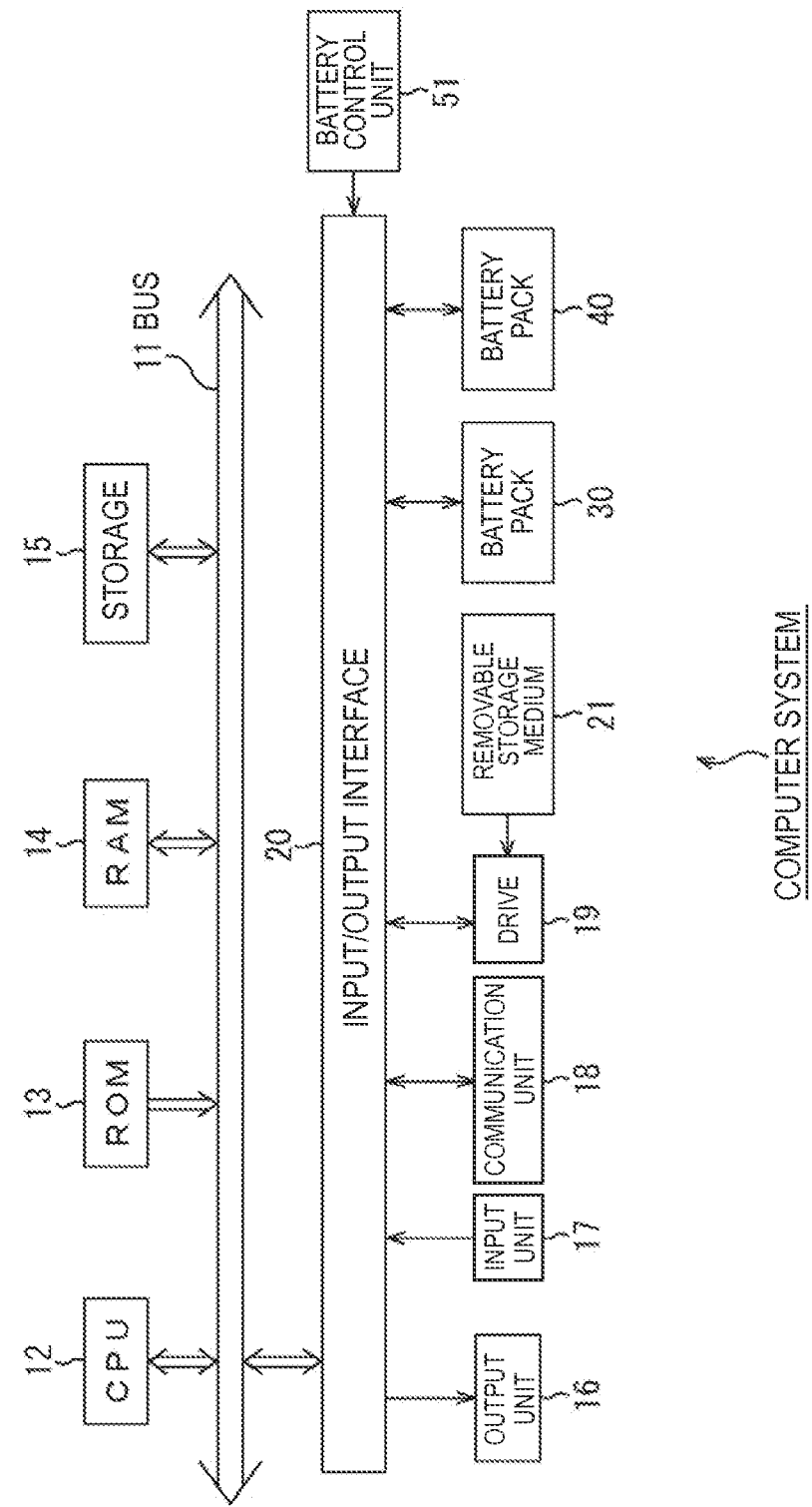
FIG. 1 is a block diagram illustrating an example of a hardware configuration of an embodiment of a computer system to which the present technology is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Computer System According to Embodiment of the Present Technology]

FIG. 1 is a block diagram illustrating an example of a hardware configuration of an embodiment of a computer system to which the present technology is applied.

In FIG. 1, for example, a computer system is configured such that a plurality of battery packs, for example, two battery packs 30 and 40, are mounted on a computer such as a note-type PC.

In FIG. 1, the computer system includes a bus 11, a central processing unit (CPU) 12, a read-only memory 13 (ROM), a random access memory (RAM) 14, a storage 15, an output unit 16, an input unit 17, a communication unit 18, a drive 19, an input/output interface 20, the battery packs 30 and 40, and a battery control unit 51.

The CPU 12, the ROM 13, the RAM 14, and the storage 15 are connected to the bus 11. The input/output interface 20 is also connected to the bus 11.

The CPU 12 executes a program stored in the ROM 13 when a predetermined trigger such as a user's operation of operating the input unit 17 is generated via the input/output interface 20. Alternatively, the CPU 12 loads a program stored in the storage 15 to the RAM 14 and executes the program.

Thus, the CPU 12 functions as a block that performs predetermined processes of a battery control unit 52 and the like to be described below. For example, the CPU 12 outputs a result of a predetermined process from the output unit 16 via the input/output interface 20, transmits the result from the communication unit 18, and records the result on the storage 15, as necessary.

A program executed by the CPU 12 can be recorded (stored) in advance in the storage 15 or the ROM 13 serving as a recording medium included in the computer.

Further, a program can be stored (recorded) in a removable recording medium 21. The removable recording medium 21 can be provided as so-called package software.

A program can be installed from the above-described removable recording medium 21 to the computer. For example, a program can be downloaded from a download site via a network such as the Internet or a digital broadcast and can be installed.

The ROM 13 stores a program or the like to be executed by the CPU 12. The RAM 14 temporarily stores a program to be executed by the CPU 12 or data necessary for a process of the CPU 12.

The storage 15 is, for example, a large-capacity recording medium such as a hard disk. A program to be executed by the CPU 12 or necessary data is recorded on the storage 15.

The output unit 16 includes a liquid crystal display (LCD) or a speaker. The output unit 16 displays a necessary image and outputs a necessary sound (audio).

The input unit 17 includes a keyboard or a mouse and is operated by the user. Further, the input unit 17 includes a microphone and inputs (collects) a sound or the like of the user.

The input unit 17 may also include, for example, a transparent touch screen and be integrated with an LCD included in the output unit 16 to serve as a touch panel.

The communication unit 18 controls communication in conformity with standards or the like of a cellular phone line such as the 3G line, a local area network (LAN) including a wireless LAN, and Bluetooth (registered trademark).

The drive 19 drives the removable recording medium 21. That is, the removable recording medium 21 can be mounted on or detachable from the drive 19. When the removable recording medium 21 is mounted on the drive 19, the drive 19 writes or reads data or the like on or from the removable recording medium 21.

The input/output interface 20 is an interface used to perform inputting and outputting of data or the like with a computer (system). In FIG. 1, the output unit 16, the input unit 17, the communication unit 18, the drive 19, the battery packs 30 and 40, and the battery control unit 51 are connected to the input/output interface 20.

The removable recording medium 21 is a recording medium such as a flexible disc, a compact disc-read only memory (CD-ROM), a magneto optical (MO) disc, a digital versatile disc (DVD), a magnetic disk, or a semiconductor memory.

The battery pack 30 is mounted to be, for example, screwed on the computer or surrounded by a cover such that it is difficult for the user to exchange the battery pack 30. In other words, the battery pack 30 is a battery pack fixed to the computer and supplies power to the computer (the CPU 12 and the like included in the computer), as necessary.

The battery pack 40 is a battery pack which can be detachably mounted on the computer easily by the user and supplies power to the computer, as necessary. In FIG. 1, the battery pack 40 is mounted on the computer.

The battery control unit 51 is configured as hardware and controls the battery packs 30 and 40.

The battery pack 30 may not be fixed to the computer, but may be configured to be detachable from or attachable to the computer.

The battery pack 40 may not be detachable from or attachable to the computer, but may be fixed to the computer.

In the computer system, a plurality of battery packs rather than only one battery pack 30 may be provided as the battery packs fixed to the computer.

Likewise, a plurality of battery packs rather than only one battery pack 40 may be provided as the battery packs which can be detachable from or attachable to the computer.

Here, the battery pack 30 fixed to the computer is necessarily mounted on the computer, but the battery pack 40 which can be detachable from or attachable to the computer is not mounted on the computer in some cases.

Accordingly, there is a higher probability that the battery pack 30 fixed to the computer is used as a power source, compared to the battery pack 40 which is not mounted on the computer.

As described above, of the two battery packs 30 and 40 serving as the plurality of battery packs mounted on the computer, the battery pack 30 having a higher probability of being used as a power source is also referred to as a main (battery) pack and the battery pack 40 having a lower probability of being used as the power source is also referred to as a sub-pack.

The computer system can be configured such that 3 or more battery packs can be mounted rather than the two battery packs 30 and 40.

When 3 or more battery packs can be mounted on the computer and 2 or more battery packs are fixed to the computer, the 2 or more battery packs fixed to the computer have no difference in a probability of being used as the power sources.

Likewise, when 3 or more battery packs can be mounted on the computer and 2 or more battery packs can be detachable from or attachable to the computer, the 2 or more battery packs detachable from or attachable to the computer have no difference in the probability of being used as the power sources.

In a computer system in which a plurality of battery packs are mounted on a computer, charging or discharging (supplying a power source to the computer) the plurality of battery packs mounted on the computer is performed, for example, on each of the battery packs.

Accordingly, in the computer system in which the plurality of battery packs are mounted, an index used to determine a charge or discharge order of the plurality of battery packs is necessary.

Accordingly, in this embodiment, for example, sequential integers equal to or greater than 1 are introduced as battery numbers and the battery numbers are assumed to be assigned to the plurality of battery packs mounted on the computer system.

When the battery numbers are assigned, for example, smaller battery numbers can be assigned to the battery packs fixed to the computer system than the battery packs which can be detachable from or attachable to the computer.

That is, the smaller battery numbers can be assigned to the battery packs having a higher probability of being used as the power sources.

For example, in any order such as a random order, numbers can be assigned to the battery packs having no difference in the probability that the plurality of battery packs will be used as the power sources.

Accordingly, for example, when a plurality of battery packs are fixed to the computer system and a plurality of detachable or attachable battery packs are mounted, ascending-order integers can be assigned as battery numbers to the plurality of battery packs fixed to the computer system, and then ascending-order integers larger than the battery numbers assigned to the battery packs fixed to the computer system can be assigned as battery numbers to the plurality of detachable or attachable battery packs mounted on the computer system.

Here, when an $n^{th}$ battery pack is assumed to be a battery pack to which a battery number #n is assigned, the battery pack 30 serving as the main pack is a $1^{st}$ battery pack and the battery pack 40 serving as the sub-pack is the $2^{nd}$ battery pack in FIG. 1.

Since there is a high probability that a battery pack to which a smaller battery number is assigned will be used as a power source, this battery pack is a battery pack to be preferentially charged, and thus has a high charge priority.

Further, since there is a high probability that a battery pack to which a smaller battery number is assigned will be used as a power source, this battery pack has to be maintained in a state which the battery pack can be used as the power source, and thus has a low discharge priority (a priority of a battery pack used as a power source). That is, the battery pack to which a larger battery number is assigned has a high discharge priority.

An alternating current (AC) adapter (not illustrated) is attached to the computer system illustrated in FIG. 1. When the AC adapter is connected to the computer system and power is supplied from the outlet to the computer system via the AC adapter, the computer system is driven using the power supplied from an outlet as a power source. In this case, charging the battery pack 30 or 40 is performed, as necessary.

On the other hand, when the AC adapter is not connected to the computer system, the computer system is driven using the power discharged (supplied) from the battery pack 30 or 40 as a power source.

[Control of Battery Pack]

Figure 2:
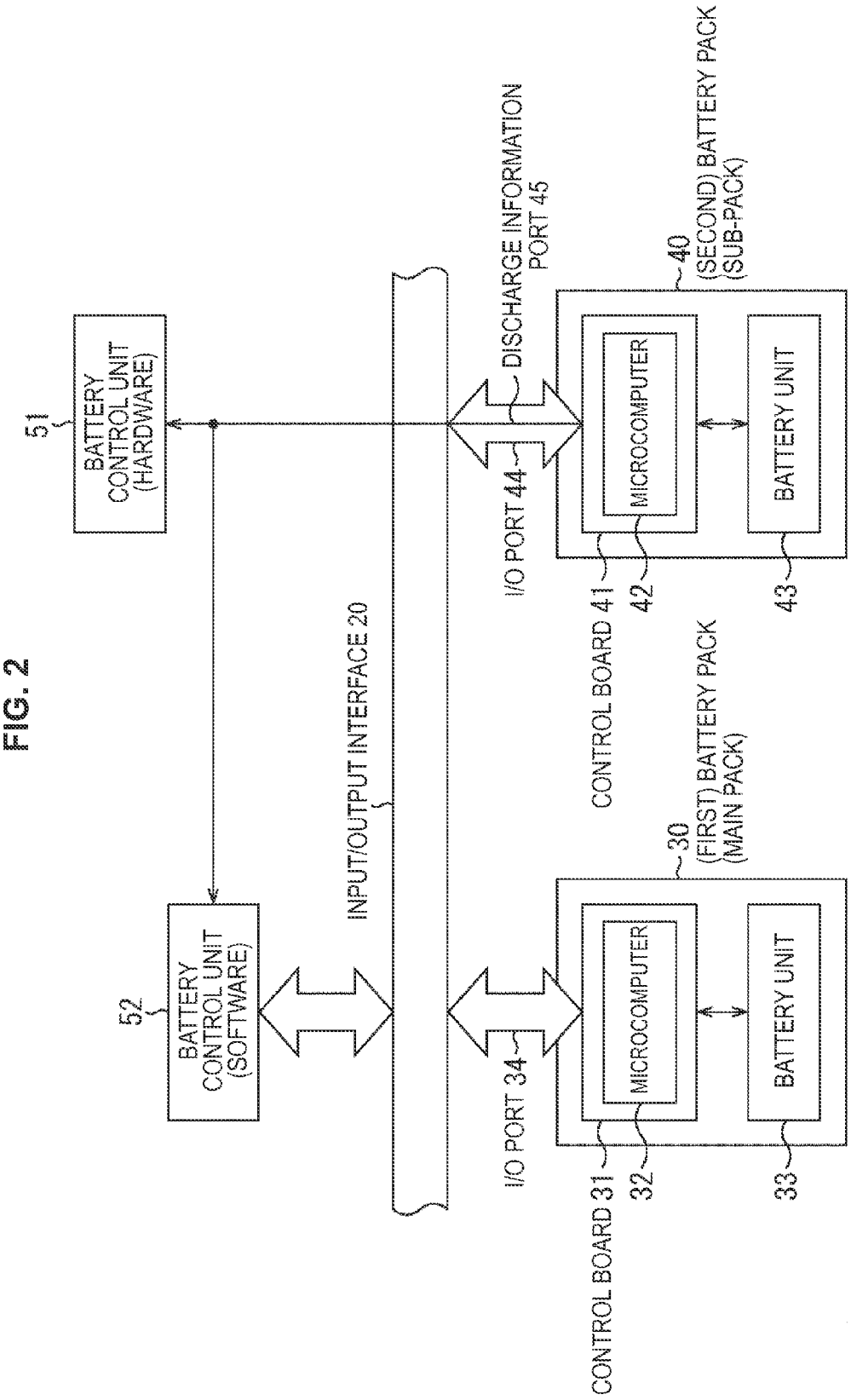
FIG. 2 is a block diagram illustrating an example of the configuration of a part related to battery packs 30 and 40 of the computer system.

FIG. 2 is a block diagram illustrating an example of the configuration of a part related to the battery packs 30 and 40 of the computer system in FIG. 1.

The battery pack 30 includes a control board 31 and a battery unit 33.

A microcomputer 32, a memory (not illustrated), and the like are installed on the control board 31. For example, the microcomputer 32 executes a program stored in the memory to control the battery unit 33 or control transmitting and receiving data (information) to and from the outside (of the battery pack 30).

The battery unit 33 includes a plurality of battery cells (not illustrated) and a protective circuit (not illustrated) and supplies power as a power source to the outside.

The battery pack 30 includes an input/output (I/O) port 34 that transmits and receives data to and from the outside.

The I/O port 34 is connected to the input/output interface 20 when the battery pack 30 is mounted on the computer system.

The battery pack 40 has substantially the same configuration as the battery pack 30.

That is, the battery pack 40 includes a control board 41 and a battery unit 43.

A microcomputer 42, a memory (not illustrated), and the like are installed on the control board 41. For example, the microcomputer 42 executes a program stored in the memory to control the battery unit 43 or control transmitting and receiving data (information) to and from the outside (of the battery pack 40).

The battery unit 43 includes a plurality of battery cells (not illustrated) and a protective circuit (not illustrated) and supplies power as a power source to the outside.

The battery pack 40 includes an input/output (I/O) port 44 that transmits and receives data to and from the outside.

The I/O port 44 is connected to the input/output interface 20, when the battery pack 40 is mounted on the computer system.

The I/O port 44 includes the same port (terminal) as the I/O port 34 and also includes a discharge information port 45 as a dedicated port that outputs discharge information indicating whether the battery pack 40 can perform discharge to the outside.

Here, the discharge information indicating whether the battery pack 40 can perform discharge is output to the discharge information port 45 in the microcomputer 42 based on a voltage and a temperature of a battery cell included in the battery unit 43.

That is, the microcomputer 42 acquires the voltage and temperature of the battery cell included in the battery unit 43 from the battery unit 43.

The memory (not illustrated) installed on the control board 41 stores dischargeable voltage information in which the minimum value (hereinafter, also referred to as a dischargeable voltage) of the voltage of the battery cell is restricted at each temperature of the battery cell, for example, when the battery cell included in the battery unit 43 is in a dischargeable state.

The microcomputer 42 outputs the discharge information indicating whether the battery pack 40 (the battery unit 43) can perform the discharge to the discharge information port 45 based on the voltage and the temperature of the battery cell from the battery unit 43 and the dischargeable voltage information.

When the battery pack 40 is mounted on the computer system, the discharge information port 45 is configured to be connected to the battery control units 51 and 52 via the input/output interface 20, and thus the discharge information is supplied from the battery pack 40 to the battery control units 51 and 52 via the discharge information port 45.

The discharge information (discharge state) includes "discharge OK" indicating that the battery pack 40 can perform the discharge and "discharge NG" indicating that the battery pack 40 may not perform the discharge.

For example, one of an H (High) level and an L (Low) level can be assigned to "discharge OK" and the other thereof can be assigned to "discharge NG."

For example, high impedance may be assigned to "discharge NG" and a state indicating no high impedance can be assigned to "discharge OK."

For example, when the voltage of the battery pack 40 (the battery cell of the battery pack 40) is equal to or greater than a dischargeable voltage, the discharge information is set to "discharge OK." When the voltage of the battery pack 40 is less than the dischargeable voltage, the discharge information is set to "discharge NG."

For example, the battery control units 51 and 52 control charging or discharging the battery packs 30 and 40.

Here, the battery control unit 51 is configured as the hardware, as described with reference to FIG. 1.

On the other hand, the battery control unit 52 is configured as software. That is, the battery control unit 52 is functionally realized by causing the CPU 12 in FIG. 1 to execute a program that manages the battery pack.

In this embodiment, the battery control unit 51 (first control unit) configured as the hardware mainly controls discharging the battery packs 30 and 40. Further, the battery control unit 52 (second control unit) configured as the software mainly controls charging the battery packs 30 and 40 and monitors (collects information such as the voltages of the battery packs 30 and 40) the battery packs 30 and 40.

The battery packs 30 and 40 may be controlled by the battery control units 51 and 52, or may be controlled by only the battery control unit 51 configured as the hardware or only the battery control unit 52 configured as the software.

[Process of Main Pack]

Figure 3:
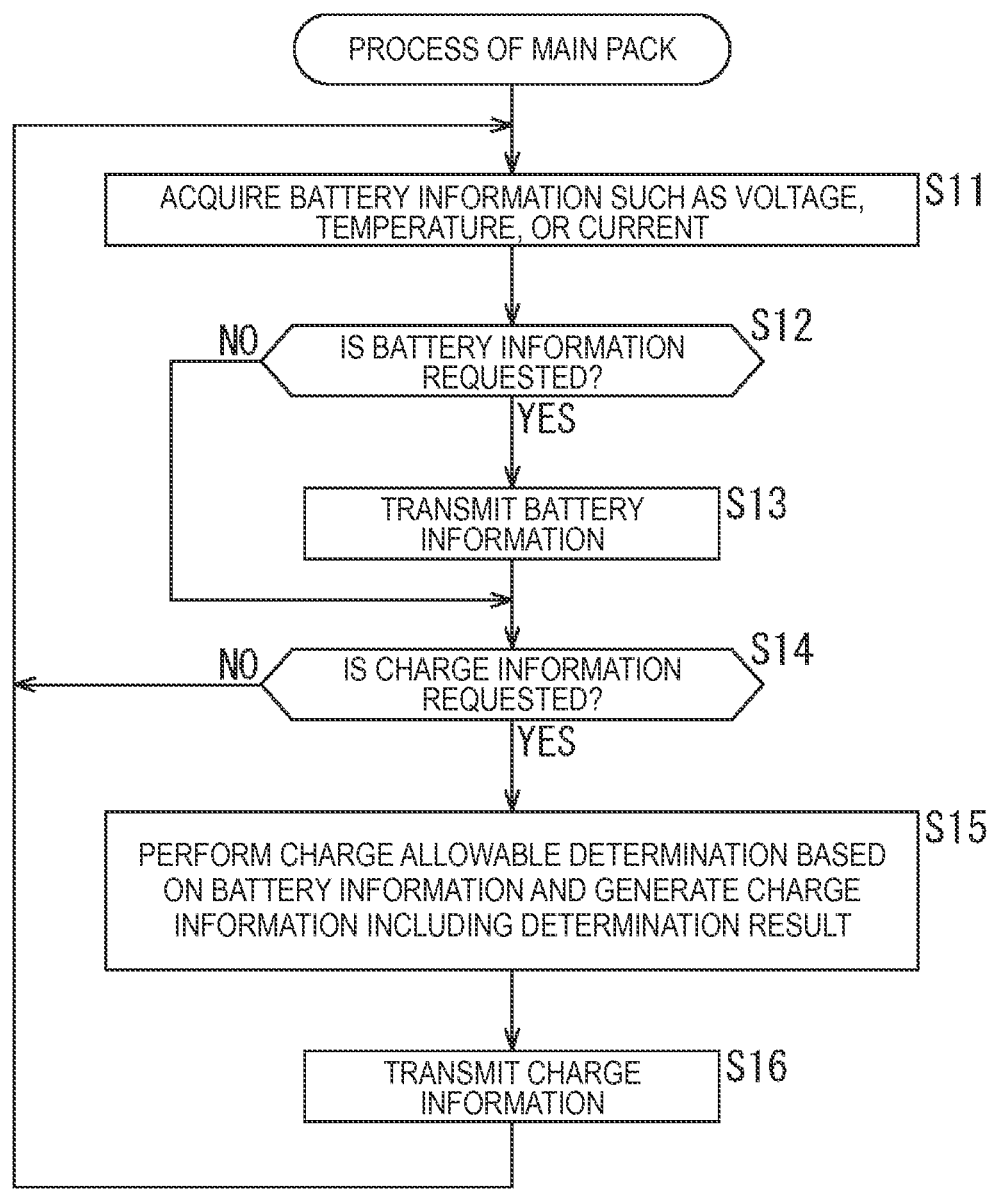
FIG. 3 is a flowchart illustrating a process of the battery pack 30 serving as a main pack.

FIG. 3 is a flowchart illustrating a process of the battery pack 30 serving as a main pack.

In step S11, the microcomputer 32 acquires, as battery information regarding the battery pack 30, the voltage or temperature of each battery cell included in the battery unit 33, a current flowing in the battery cell, and various kinds of information regarding the battery cell, such as a remaining capacity of the battery pack 30 obtained from the voltage or the like of the battery cell. Then, the process proceeds to step S12.

Here, the battery information regarding the battery pack may include not only the above-described voltage of the battery cell but also information indicating whether the battery pack is in a fully charged state.

When so-called attention charge is set in the battery pack to stop the charge of the battery pack at a remaining capacity of X % less than full charge of 100%, the battery information may include information indicating whether the remaining capacity of the battery pack is set to a setting value of a capacity set in the setting of the attention charge and used to stop the charge.

In step S12, the microcomputer 32 determines whether the battery control unit 52 requests the battery information via the input/output interface 20 and the I/O port 34.

That is, for example, the battery control unit 52 performs polling on the battery pack 30 to request the battery information via the input/output interface 20 and the I/O port 34 periodically through communication. Thus, in step S12, it is determined whether the polling is performed.

When it is determined in step S12 that the battery information is not requested, step S13 is skipped and the process proceeds to step S14.

Conversely, when it is determined in step S12 that the battery information is requested, the process proceeds to step S13. The microcomputer 32 transmits the battery information acquired in the immediately previously performed step S11 to the battery control unit 52 via the I/O port 34 and the input/output interface 20. Then, the process proceeds to step S14.

In step S14, the microcomputer 32 determines whether the battery control unit 52 requests charge information regarding the battery pack 30 via the input/output interface 20 and the I/O port 34 through communication.

Here, the charge information regarding the battery pack is information indicating whether the battery pack is chargeable. For example, when the battery packs mounted on the computer system are charged, the battery control unit 52 requests the charge information to all of the battery packs mounted on the computer system via the input/output interface 20.

When it is determined in step S14 that the charge information regarding the battery pack 30 is not requested, the processes of step S15 and step S16 are skipped, the process returns to step S11 and the same process is repeated subsequently.

Conversely, when it is determined in step S14 that the charge information regarding the battery pack 30 is requested, the process proceeds to step S15. The microcomputer 32 performs charge allowable determination to determine whether the battery pack 30 is chargeable based on the battery information regarding the battery pack 30 acquired in the immediately previously performed step S11.

Here, in the charge allowable determination of the battery pack, "charge disallowance" (or "charge prohibition" indicating that charge is prohibited) indicating that the battery pack may not be charged is determined, when the voltage of the battery cell of the battery pack is equal to or greater than a predetermined voltage used to prevent overcharge.

In the charge allowable determination of the battery pack, "charge disallowance" is also determined when balance of the voltages of the battery cells of the battery pack is poorer than predetermined balance for the battery pack, when the temperature of the battery cell of the battery pack is not within a predetermined usable range for the battery pack, or when a current flowing in the battery cell of the battery pack is not within a predetermined usable range.

In the charge allowable determination of the battery pack, "charge disallowance" is determined when the battery pack is in the fully charged state and when the remaining capacity of the battery pack is set to the setting value of a capacity set in the setting of the attention charge and used to stop the charge.

In the charge allowable determination of the battery pack, the battery pack determines that the charge is possible when "charge disallowance" is not determined. However, in this case, it can be also determined whether high-speed charge in which a charge speed is fast is possible (hereinafter, also referred to as determination of high-speed charge).

Here, in general, the charge speed of the battery pack is high until the remaining capacity of the battery pack reaches a predetermined threshold value th % (th % when the full charge is set to 100%). However, the charge speed of the battery pack is low when the remaining capacity of the battery exceeds the predetermined threshold value th %.

When the predetermined threshold value th % is assumed to be a capacity threshold value, the capacity threshold value differs depending on, for example, the specification of the battery pack.

In the battery pack 30 (likewise in the battery pack 40), the capacity threshold value corresponding to the specification of the battery pack 30 is stored in the memory (not illustrated) installed on the control board 31. The microcomputer 32 determines the high-speed charge based on the capacity threshold value.

That is, the microcomputer 32 calculates the remaining capacity of the battery pack 30 (the battery cell of the battery pack 30) based on the voltage and temperature of the battery cell, the current flowing in the battery cell, or the like as the battery information regarding the battery pack 30.

When the remaining capacity of the battery pack 30 is equal to or less than the capacity threshold value, the microcomputer 32 of the battery pack 30 determines "high-speed charge allowance" indicating that the high-speed charge in which the charge speed is fast is possible.

Conversely, when the remaining capacity of the battery pack 30 is greater than the capacity threshold value, the microcomputer 32 of the battery pack 30 determines "high-speed charge disallowance" indicating that the high-speed charge in which the charge speed is fast may not be possible.

In step S15, the microcomputer 32 determines whether the battery pack 30 is chargeable and whether the high-speed charge is possible, as described above. Then, the microcomputer 32 generates charge information including the determination results and the process proceeds to step S16.

In step S16, the microcomputer 32 transmits the charge information obtained in the immediately previously performed step S15 to the battery control unit 52 via the I/O port 34 and the input/output interface 20 through communication. Then, the process returns from step S16 to step 11 and the same process is repeated subsequently.

Here, the battery pack 30 and the battery pack 40 determine the high-speed charge of the battery pack mounted on the computer system in FIG. 1. However, not the battery packs but the battery control unit 52 may determine the high-speed charge.

When the battery control unit 52 determines the high-speed charge of the battery pack mounted on the computer system, the battery control unit 52 acquires the remaining capacity of the battery pack and determines whether the remaining capacity is equal to or less than the capacity threshold value. When the remaining capacity of the battery pack is equal to or less than the capacity threshold value, "high-speed charge allowance" is determined. When the remaining capacity of the battery pack is greater than the capacity threshold value, "high-speed charge disallowance" is determined.

As described above, when the battery control unit 52 outside the battery pack determines the high-speed charge, a value common to battery packs with various specifications is used as the capacity threshold value. In other words, an average value (for example, 80%) is used.

Even when an average value used commonly in the battery packs with various specifications is used as the capacity threshold value, determination accuracy decreases in the determination of the high-speed charge.

In this embodiment, however, in the battery pack 30, the capacity threshold value corresponding to the specification of the battery pack 30 is stored in the memory (not illustrated) installed on the control board 31. Further, the microcomputer 32 determines the high-speed charge based on the capacity threshold value. Therefore, the high-speed charge can be accurately determined (the accuracy of the determination of the high-speed charge can be improved).

In FIG. 3, the example in which the battery information or the charge information is transmitted to the battery control unit 52 when the battery control unit 52 makes the request to the battery pack 30 has been described. However, the battery information or the charge information may be transmitted from the battery pack 30 to the battery control unit 52 periodically or irregularly without waiting for the request from the battery control unit 52. The same also applies to the battery pack 40.

[Process of Sub-Pack]

Figure 4:
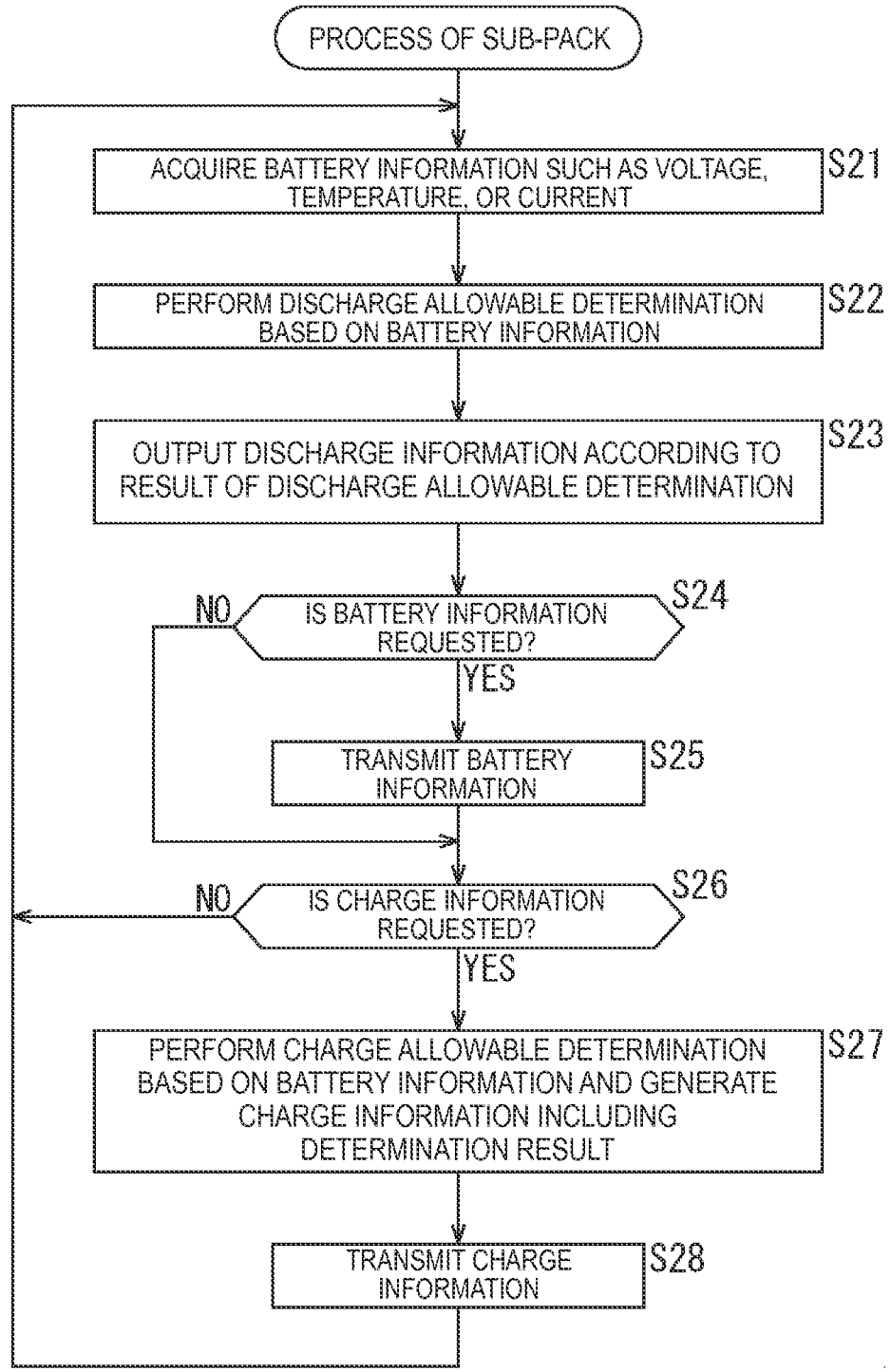
FIG. 4 is a flowchart illustrating a process of the battery pack 40 serving as a sub-pack.

FIG. 4 is a flowchart illustrating a process of the battery pack 40 serving as a sub-pack.

As in the battery pack 30, battery information or charge information is transmitted from the battery pack 40 to the battery control unit 52.

Further, discharge information is output from the battery pack 40. From this viewpoint, the battery pack 40 is different from the battery pack 30.

That is, in step S21, the microcomputer 42 of the battery pack 40 performs the same process as in step S11 of FIG. 3 to acquire battery information regarding the battery pack 40 such as the voltage, the temperature and the remaining capacity of each battery cell included in the battery unit 43. Then, the process proceeds to step S22.

In step S22, the microcomputer 42 performs discharge allowable determination to determine whether the battery pack 40 is dischargeable based on the battery information regarding the battery pack 40 acquired in the immediately previously performed step S21. Then, the process proceeds to step S23.

That is, in step S22, the microcomputer 42 determines that the battery pack 40 is dischargeable with reference to dischargeable voltage information stored in the memory (not illustrated) installed on the control board 41, when the voltage of the battery pack 40 (the battery cell of the battery pack) is equal to or greater than the dischargeable voltage included in dischargeable voltage information.

Conversely, when the voltage of the battery pack 40 is less than the dischargeable voltage included in the dischargeable voltage information, the microcomputer 42 determines that the battery pack 40 may not be discharged. For example, when the temperature of the battery cell of the battery pack 40 is not within a predetermined usable range for the battery pack 40 or when a current flowing in the battery cell of the battery pack 40 is not within a predetermined usable range for the battery pack 40, the microcomputer 42 also determines that the battery pack 40 may not be discharged.

In step S23, the microcomputer 42 outputs the discharge information (changes the discharge information on the discharge information port 45) to the discharge information port 45 according to the determination result obtained in the discharge allowable determination of the immediately previously performed step S22. Then, the process proceeds to step S24.

That is, when the microcomputer 42 determines that the battery pack 40 is dischargeable in the discharge allowable determination of step S22, the discharge information on the discharge information port 45 is referred to as "discharge OK." Further, when the microcomputer 42 determines that the battery pack 40 may not be discharged in the discharge allowable determination of step S22, the discharge information on the discharge information port 45 is referred to as "discharge NG."

In step S24, the microcomputer 42 determines whether the battery control unit 52 requests the battery information via the input/output interface 20 and the I/O port 44.

That is, for example, the battery control unit 52 performs polling on the battery pack 40 to request the battery information via the input/output interface 20 and the I/O port 44 periodically through communication. Thus, in step S24, it is determined whether the polling is performed.

When it is determined in step S24 that the battery information is not requested, the process of step S25 is skipped and the process proceeds to step S26.

Conversely, when it is determined in step S24 that the battery information is requested, the process proceeds to step S25. The microcomputer 42 transmits the battery information acquired in the immediately previously performed step S21 to the battery control unit 52 via the I/O port 44 and the input/output interface 20 through communication. Then, the process proceeds to step S26.

In step S26, the microcomputer 42 determines whether the battery control unit 52 requests charge information regarding the battery pack 40 via the input/output interface 20 and the I/O port 44.

That is, as described with reference to FIG. 3, the battery control unit 52 requests the charge information from all of the battery packs mounted on the computer system via the input/output interface 20. Therefore, in step S26, it is determined whether the charge information is requested.

When it is determined in step S26 that the charge information regarding the battery pack 40 is not requested, the process of step S27 and step S28 are skipped, the process returns to step S21 and the same process is repeated subsequently.

Conversely, when it is determined in step S26 that the charge information regarding the battery pack 40 is requested, the process proceeds to step S27. The microcomputer 42 performs charge allowable determination to determine whether the battery pack 40 is chargeable based on the battery information regarding the battery pack 40 acquired in the immediately previously performed step S21 and generates the charge information including the determination result. Then, the process proceeds to step S28.

The charge allowable determination of the battery pack 40 in step S27 is performed as in step S15 of FIG. 3. Accordingly, "charge disallowance" indicating that the charge may not be performed, "high-speed charge allowance" indicating that high-speed charge in which the charge speed is fast is possible, or "high-speed charge disallowance" is determined on the battery pack 40. The charge information including the determination result is generated.

In step S28, the microcomputer 42 transmits the charge information obtained in the immediately previously performed step S27 to the battery control unit 52 via the I/O port 44 and the input/output interface 20 through communication. Then, the process returns from step S28 to step 21 and the same process is repeated subsequently.

[Charge Speed of Battery Pack]

Figure 5:
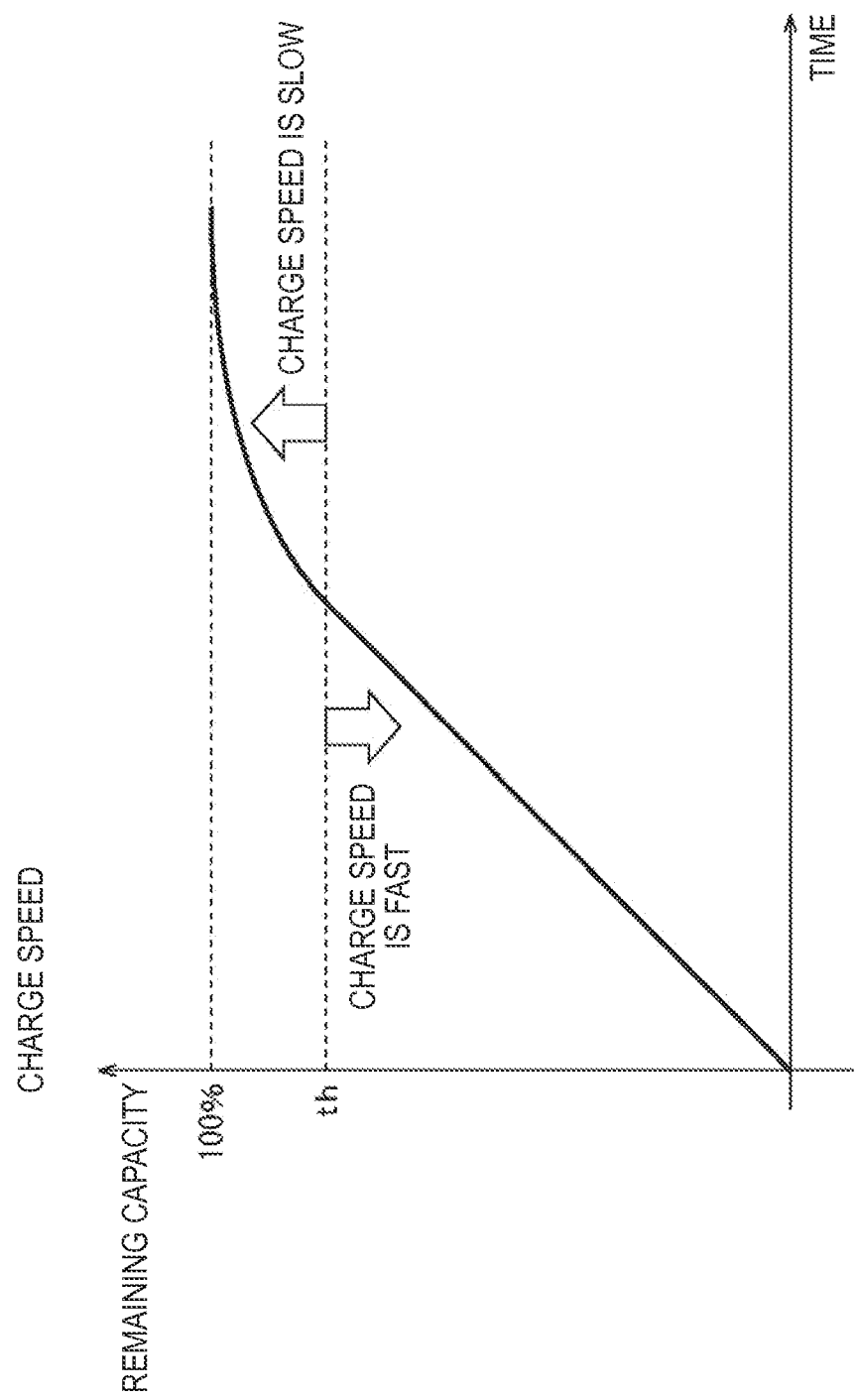
FIG. 5 is a diagram illustrating a charge speed of the battery pack.

FIG. 5 is a diagram illustrating a charge speed of the battery pack.

That is, in FIG. 5, a temporal change in the remaining capacity of a battery pack is illustrated when the battery pack is charged.

In FIG. 5, the horizontal axis represents time and the vertical axis represents the remaining capacity of the battery pack.

As illustrated in FIG. 5, when a case in which the remaining capacity of the battery pack is equal to or less than a capacity threshold value th % is compared to a case in which the remaining capacity of the battery pack is greater than the capacity threshold value th %, a charge speed of the battery pack in the case in which the remaining capacity of the battery pack is equal to or less than the capacity threshold value th % is faster than a charge speed of the battery pack in the case in which the remaining capacity of the battery pack is greater than the capacity threshold value th %.

Accordingly, when the remaining capacity of the battery pack is equal to or less than the capacity threshold value th %, high-speed charge can be performed on the battery pack.

As described with reference to FIG. 3, the capacity threshold value th % differs according to the specification of the battery pack.

[Method of Charging Dual Battery System]

Figure 6:
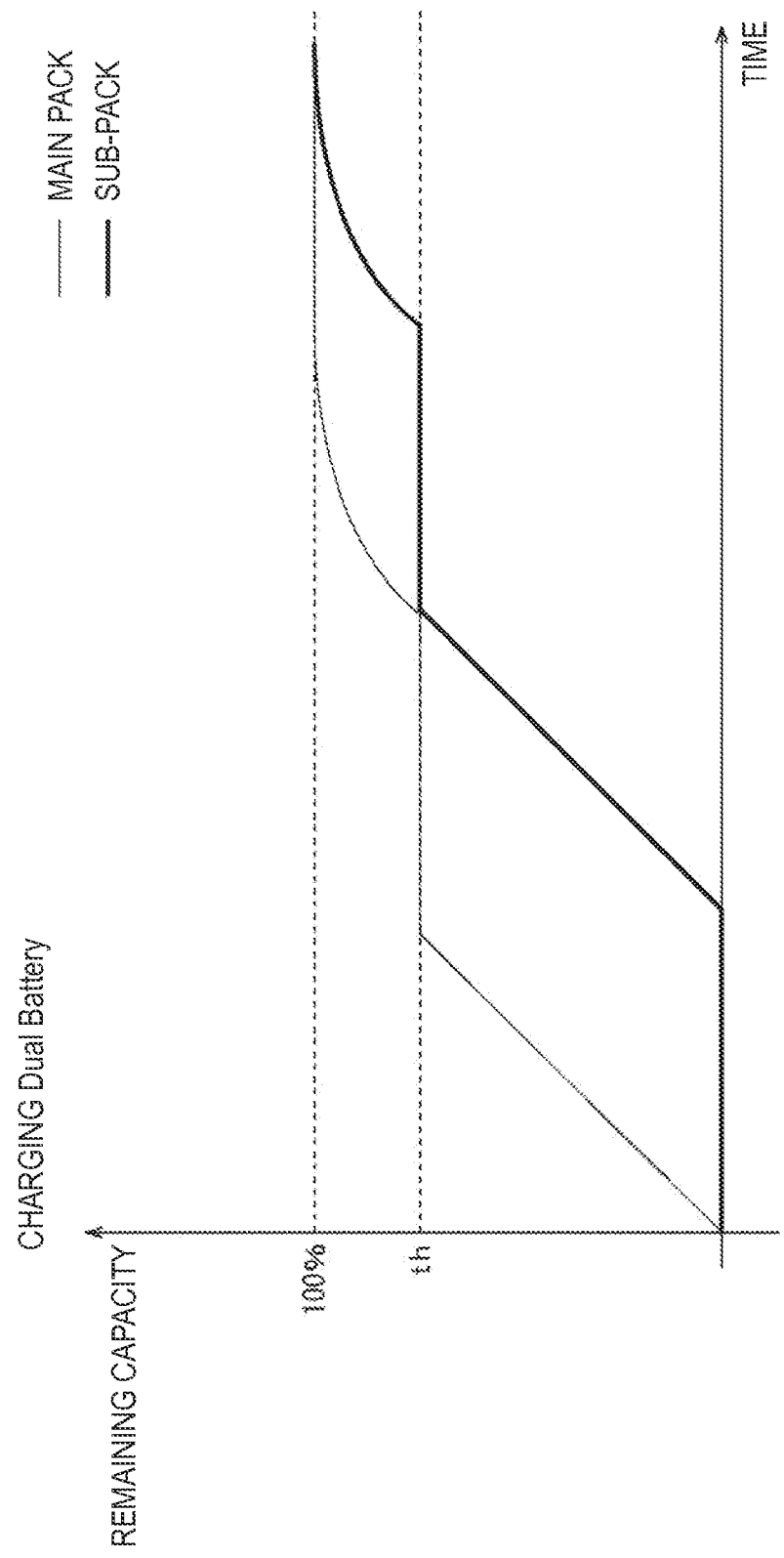
FIG. 6 is a diagram illustrating a method of charging a main pack and a sub-pack in a dual battery system on which the main pack and the sub-pack are mounted.

FIG. 6 is a diagram illustrating a method of charging a main pack and a sub-pack in a dual battery system on which the main pack and the sub-pack which are the same as the battery packs 30 and 40 are mounted.

In FIG. 6, the horizontal axis represents time and the vertical axis represents the remaining capacity of the battery pack.

In FIG. 6, a common value th % set in advance as the capacity threshold value of the battery packs 30 and 40 is used.

As described with reference to FIG. 5, the high-speed charge can be performed on the battery pack (the charge speed is fast), when the remaining capacity of the battery pack is equal to or less than the capacity threshold value th %. The high-speed charge may not be performed (the charge speed is slowed) when the remaining capacity of the battery pack is greater than the capacity threshold value th %.

That is, the charge can be performed at a high speed up to the capacity threshold value th % of the battery pack, but the charge is performed at a low speed from the capacity threshold value th % to the full charge.

Accordingly, in the dual battery system, one of the main pack and the sub-pack, for example, the main pack with a high charge priority, is first charged until the remaining capacity of the main pack reaches the capacity threshold value th %.

Thereafter, the other of the main pack and the sub-pack, that is, the sub-pack with a low charge priority, is charged until the remaining capacity of the sub-pack reaches the capacity threshold value th %.

Until the remaining capacity reaches the capacity threshold value th %, both the main pack and the sub-pack can be charged at a high speed.

As described above, the main pack and the sub-pack are charged until the remaining capacity reaches the capacity threshold value th %. Thereafter, the main pack with the high charge priority is charged again until the main pack is fully charged (100%).

Subsequently, the sub-pack with the low charge priority is charged until the sub-pack is fully charged.

As described above, the remaining capacities of both the main pack and the sub-pack can be charged efficiently in a short time up to a value equal to or greater than the capacity threshold value th % by sequentially charging the main pack and the sub-pack until their remaining capacities reach the capacity threshold value th %, and then sequentially charging the main pack and the sub-pack until the main pack and the sub-pack are fully charged, compared to a case in which the main pack is charged until the main pack is fully charged, and then the sub-pack is charged until the sub-pack is fully charged.

[Control of Discharge of Battery Pack]

Figure 7:
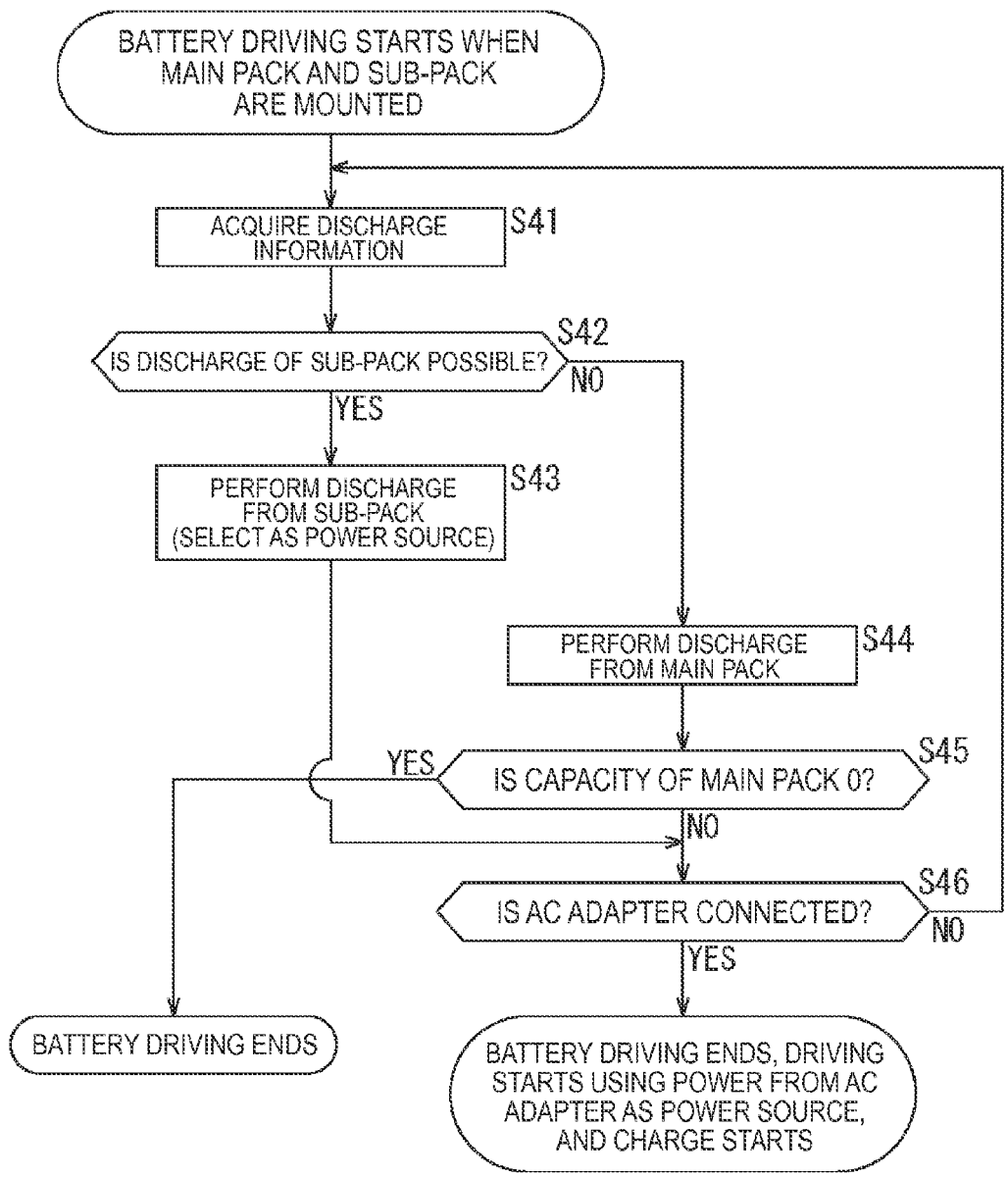
FIG. 7 is a flowchart illustrating control of discharge.

FIG. 7 is a flowchart illustrating control of discharge of the battery packs 30 and 40.

When the battery packs 30 and 40 are mounted and the computer system in FIG. 1 is driven (battery-driven) using the power discharged from one of the battery packs 30 and 40 as the power source, the battery control unit 51 acquires the discharge information regarding the battery pack 40 output from the battery pack 40 via the discharge information port 45 serving as the dedicated port in step S41. Then, the process proceeds to step S42.

Here, for example, when the computer system in FIG. 1 is turned on without connection of AC adapter or when the computer system is turned on with connection of the AC adapter but the AC adapter is detached thereafter, the computer system is battery-driven (the computer system is driven using the power discharged from the battery pack as the power source).

In step S42, based on the discharge information, the battery control unit 51 determines whether the discharge from the battery pack 40 serving as the sub-pack (supply of the power as the power source) is possible.

When it is determined in step S42 that the discharge from the battery pack 40 serving as the sub-pack is possible, that is, the discharge information regarding the battery pack 40 is "discharge OK," the process proceeds to step S43. The battery control unit 51 selects the battery pack 40 serving as the sub-pack as the power source and controls the computer system such that the computer system is driven by the power discharged from the battery pack 40.

As described above, the battery pack 40 is selected as the power source in step S43, and then the process proceeds to step S46.

Conversely, when it is determined in step S42 that the discharge from the battery pack 40 serving as the sub-pack may not be possible, that is, the discharge information regarding the battery pack 40 is "discharge NG," the process proceeds to step S44. The battery control unit 51 selects the battery pack 30 serving as the main pack as the power source and controls the computer system such that the computer system is driven by the power discharged from the battery pack 30.

Thereafter, the process proceeds from step S44 to step S45. The battery control unit 52 acquires the latest battery information regarding the battery pack 30 from the battery pack 30 serving as the main pack and determines whether the remaining capacity of the battery pack 30 is (almost) 0% based on the latest battery information.

Here, when the discharge information of the battery pack 40 is "discharge NG," the battery control unit 52 recognizes that the discharge from the battery pack 40 may not be possible. When the discharge from the battery pack 40 is not possible, the battery control unit 52 acquires battery information regarding the battery pack 30 and determines whether the remaining capacity of the battery pack 30 is 0% based on the battery information.

When it is determined in step S45 that the remaining capacity of the battery pack 30 is 0%, the battery driving, that is, the driving of the computer system using the battery packs 30 and 40 as the power sources, ends.

Conversely, when it is determined in step S45 that the remaining capacity of the battery pack 30 is not 0%, that is, the battery driving can proceed by the battery pack 30, the process proceeds to step S46. The battery control unit 52 determines whether the AC adapter is connected to the computer system, that is, whether the computer system can be driven using the power supplied from an outlet via the AC adapter as a power source.

When it is determined in step S46 that the AC adapter is not connected to the computer system, the process returns to step S41 and the same process is repeated subsequently.

Conversely, when it is determined in step S46 that the AC adapter is connected to the computer system, the battery driving ends and driving (hereinafter, also referred to as AC driving) of the computer system using the power from the AC adapter as the power source starts. Further, charging the battery packs 30 and 40 mounted on the computer system starts.

Figure 8:
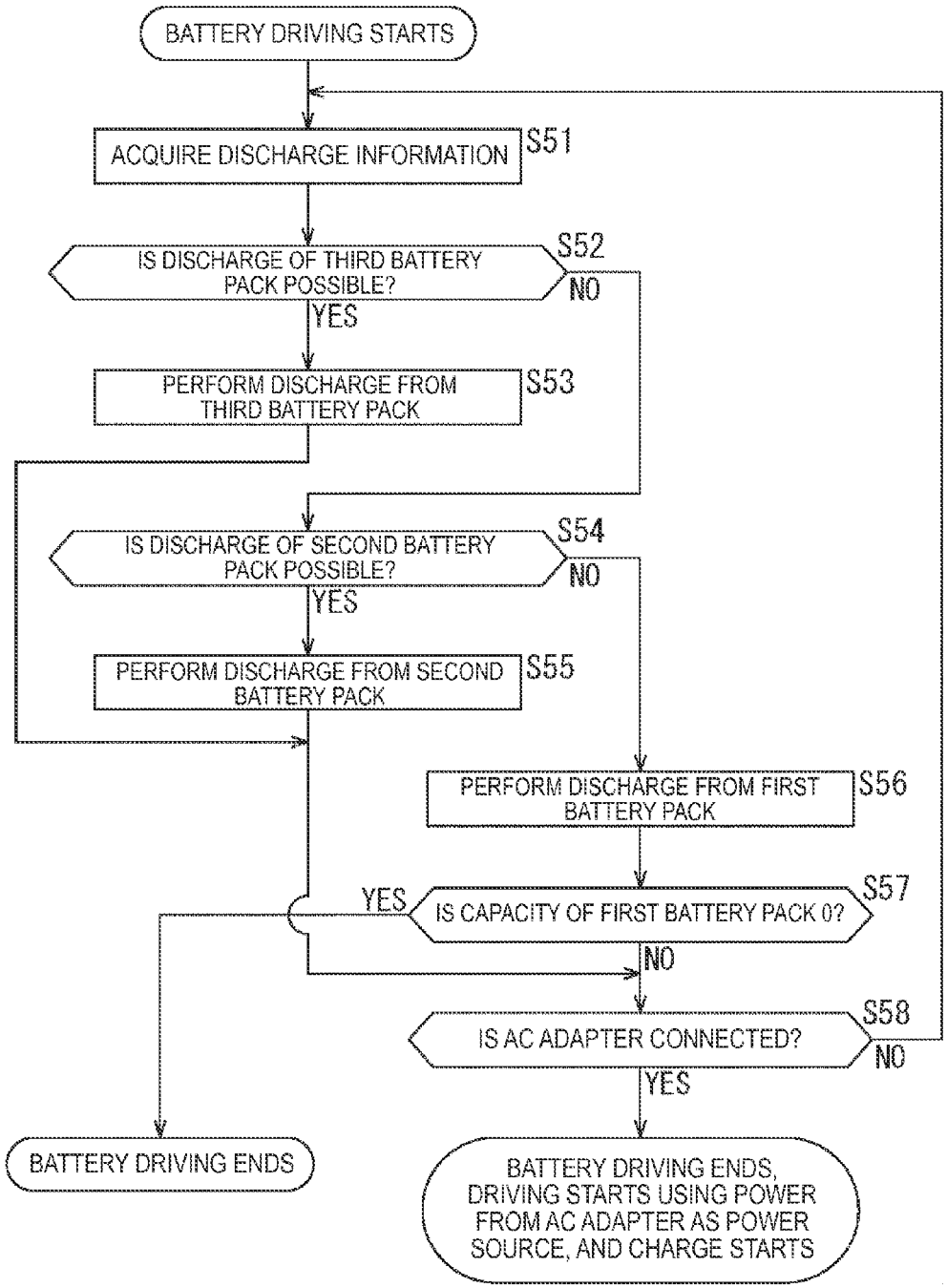
FIG. 8 is a flowchart illustrating control of discharge.

FIG. 8 is a flowchart illustrating control of discharge when three battery packs are mounted on the computer system.

In FIG. 8, three battery packs, a first battery pack, a second battery pack, and a third battery pack, are assumed to be mounted on the computer system.

For example, when three battery packs can be mounted on the computer system in FIG. 1 and a new detachable attachable battery pack (not illustrated) that is mounted on the computer system and has the same configuration as the battery pack 40 is mounted on the computer system in addition to the battery packs 30 and 40, the battery pack 30 serves as the first battery pack.

One of the battery pack 40 and the new battery pack serves as the second battery pack and the other thereof serves as the third battery pack. Here, for example, the battery pack 40 is assumed to serve as the second battery pack and the new battery pack is assumed to serve as the third battery pack.

In this case, as described with reference to FIG. 1, the discharge priority (a discharge priority for ranking based on battery numbers) based on the battery numbers is higher in the order of the third battery pack, the second battery pack, and the first battery pack.

When the first battery pack (the battery pack 30), the second battery pack (the battery pack 40), and the third battery pack (the new battery pack having the same configuration as the battery pack 40) are mounted and the computer system in FIG. 1 is battery-driven using any one of the first to third battery packs, the battery control unit 51 acquires discharge information regarding the second and third battery packs from the second and third battery packs in step S51. Then, the process proceeds to step S52.

In step S52, the battery control unit 51 determines whether the discharge (supply of power from the power source) from the third battery pack is possible based on the discharge information regarding the third battery pack with the highest discharge priority which is based on the battery number among the first to third battery packs.

When it is determined in step S52 that the discharge from the third battery pack is possible, that is, the discharge information regarding the third battery pack is "discharge OK," the process proceeds to step S53. The battery control unit 51 selects the third battery pack as a power source and controls the computer system such that the computer system is driven by the power discharged from the third battery pack.

As described above, the third battery pack is selected as the power source in step S53, and then the process proceeds to step S58.

Conversely, when it is determined in step S52 that the discharge from the third battery pack is not possible, that is, the discharge information regarding the third battery pack is "discharge NG," the process proceeds to step S54. The battery control unit 51 determines whether the discharge from the second battery pack is possible based on the discharge information regarding the second battery pack (the battery pack 40) with the next higher discharge priority (here, the second highest) which is based on the battery number among the first to third battery packs.

When it is determined in step S54 that the discharge from the second battery pack is possible, that is, the discharge information regarding the second battery pack is "discharge OK," the process proceeds to step S55. The battery control unit 51 selects the second battery pack as the power source and controls the computer system such that the computer system is driven by the power discharged from the second battery pack.

As described above, the second battery pack is selected as the power source in step S55, and then the process proceeds to step S58.

Conversely, when it is determined in step S54 that the discharge from the second battery pack is not possible, that is, the discharge information regarding both the second and third battery packs is "discharge NG," the process proceeds to step S56. The same processes as those of step S44 to step S46 of FIG. 7 are subsequently performed in step S56 to step S58.

That is, in step S56, the battery control unit 51 selects the first battery pack (the battery pack 30) with the lowest discharge priority as the power source and controls the computer system such that the computer system is driven by the power discharged from the first battery pack.

Thereafter, the process proceeds from step S56 to step S57. The battery control unit 52 acquires the battery information regarding the first battery pack from the first battery pack and determines whether the remaining capacity of the first battery pack is (almost) 0% based on the battery information.

When it is determined in step S57 that the remaining capacity of the first battery pack is 0%, the battery driving ends due to the fact that it is difficult to perform the battery driving, that is, no power may be obtained as the power source from any of the first to third battery packs.

Conversely, when it is determined in step S57 that the remaining capacity of the first battery pack is not 0%, that is, when the battery driving can proceed by the first battery pack, the process proceeds to step S58. The battery control unit 52 determines whether the AC adapter is connected to the computer system, that is, whether the computer system can be driven using power supplied from an outlet via the AC adapter as a power source.

When it is determined in step S58 that the AC adapter is not connected to the computer system, the process returns to step S51 and the same process is repeated subsequently.

Conversely, when it is determined in step S58 that the AC adapter is connected to the computer system, the battery driving ends and the AC driving starts. Further, charging of the first to third battery packs mounted on the computer system starts.

The control of the discharge at the time of the battery driving has been described when two battery packs, the battery packs 30 and 40, are mounted on the computer system and when three battery packs, the first to third battery packs, are mounted on the computer system. However, when four or more battery packs are mounted on the computer system, the same control of the discharge can be performed.

For example, it is assumed that the battery pack 30 is mounted as a first battery pack and N−1 battery packs having the same configuration as the detachable or attachable battery pack 40 are mounted as second to $N^{th}$ battery packs on the computer system. When a battery pack (at least one battery pack among the second to $N^{th}$ battery packs) other than the first battery pack can perform discharge as a predetermined battery pack among the first to $N^{th}$ battery packs, the battery control unit 51 selects the dischargeable battery pack (which is, for example, the battery pack with the highest discharge priority among the plurality of battery packs, when there are a plurality of the dischargeable battery packs) as a power source based on discharge information regarding the second to $N^{th}$ battery packs.

Based on the discharge information regarding the second to $N^{th}$ battery packs, the battery control unit 51 selects the first battery pack as the power source when all of the battery packs (the second to $N^{th}$ battery packs) other than the first battery pack may not perform the discharge as the predetermined battery pack among the first to $N^{th}$ battery packs.

For example, as illustrated in FIGS. 1 and 2, in the dual battery system on which two battery packs, the battery pack 30 serving as the main pack and the battery pack 40 serving as the sub-pack, are mounted, when the battery packs are used as the power sources in the order of higher discharge priority, that is, the order of the battery pack 40 serving as the sub-pack and the battery pack 30 serving as the main pack in the battery driving, as described with reference to FIG. 7, the battery control unit 51 configured by the hardware does not perform the control of the discharge to switch the battery pack used as the power source. However, the battery control unit 52 configured by the software can acquire battery information such as the remaining capacity or temperature of the battery pack 40 through communication at given intervals of 1 second, 10 seconds, or the like by software control and perform the control of the discharge to switch the battery pack used as the power source from the battery pack 40 to the battery pack 30 based on the remaining capacity or the like of the battery pack 40.

In this case, the remaining capacity (hereinafter, also referred to as a switching capacity) of the battery pack 40 used to switch the battery pack from the battery pack 40 to the battery pack 30 is set for each temperature of the battery pack 40. The battery control unit 52 switches the battery pack from the battery pack 40 to the battery pack 30 based on the remaining capacity and the temperature of the battery pack 40 acquired from the battery pack 40 by the software control.

However, when the battery control unit 52 switches the battery pack from the battery pack 40 to the battery pack 30 based on the battery information regarding the battery pack 40 acquired through the communication by the software control, it takes some time to switch the battery pack due to the software control or the interval at which the battery information is acquired through the communication.

For this reason, when the switching capacity of the battery pack 40 is set to (almost) 0%, there is a concern that a time of the switching of the battery pack from the battery pack 40 to the battery pack 30 may be missed and unexpected shutdown may occur in the computer system when the remaining capacity of the battery pack 40 abruptly becomes 0% due to, for example, a sharp increase in load in the computer system.

Accordingly, when the battery control unit 52 switches the battery pack from the battery pack 40 to the battery pack 30 based on the battery information regarding the battery pack 40 acquired through the communication by the software control, it is necessary to set the switching capacity to a margin of a few % rather than 0%.

However, when the switching capacity of the battery pack 40 is set to a few %, a time in which the battery driving can be performed may be shortened (the use efficiency of the battery pack 40 may deteriorate), compared to the case in which the switching capacity is set to 0%.

Even when the switching capacity is set to a few %, it takes some time to switch the battery pack when the battery control unit 52 switches the battery pack from the battery pack 40 to the battery pack 30 based on the battery information regarding the battery pack 40 acquired through the communication by the software control. Therefore, when the discharge from the battery pack 40 is abruptly stopped due to protection or the like by a protective circuit (not illustrated) included in the battery unit 43 of the battery pack 40, there is a concern that the time of the switching of the battery pack from the battery pack 40 to the battery pack 30 may be missed and unexpected shutdown may occur in the computer system.

In the control of the discharge described with reference to FIG. 7 (and FIG. 8), since the battery control unit 51 controls the discharge based on the discharge information which is output by the battery pack 40 and indicates whether the discharge is possible, it is possible to appropriately perform the discharge.

That is, since the battery control unit 51 configured by the hardware switches the battery pack from the battery pack 40 to the battery pack 30 by hardware control based on the discharge information output (normally) from the discharge information port 45, which is the dedicated port, by the battery pack 40, it is possible to instantaneously switch the battery pack that performs the discharge.

As described above, it is possible to instantaneously switch the battery pack that performs the discharge from the battery pack 40 to the battery pack 30. Therefore, even when the switching capacity is set to 0%, it is possible to prevent the switching time of the battery pack from the battery pack 40 to the battery pack 30 from being missed and prevent the unexpected shutdown of the computer system from occurring when the remaining capacity of the battery pack 40 abruptly becomes 0% due to, for example, the sharp increase in load.

Accordingly, since the switching capacity of the battery pack 40 can be set to (almost) 0%, it is possible to prevent the time in which the battery driving can be performed from being shortened.

Based on the voltage or the like of (the battery cell of) the battery pack 40, the battery pack 40 outputs the discharge information indicating whether the discharge is possible. Therefore, when the discharge from the battery pack 40 is stopped due to, for example, the protection by the protective circuit included in the battery unit 43 of the battery pack 40, the discharge information output by the battery pack 40 is "discharge NG." Thus, the battery pack is instantaneously switched from the battery pack 40 to the battery pack 30.

Accordingly, when the discharge from the battery pack 40 is stopped due to, for example, the protection by the protective circuit, it is possible to prevent the switching time of the battery pack from the battery pack 40 to the battery pack 30 from being missed and prevent the unexpected shutdown of the computer system from occurring.

[Control of Charge of Battery Pack]

FIG. 9 is a flowchart illustrating control of the charge in the computer system in FIG. 1 (and FIG. 2).

In FIG. 9, for example, the battery pack 30 and N−1 detachable or attachable battery packs having the same configuration as the battery pack 40 are assumed to be mounted on the computer system in FIG. 1. In this case, the battery pack 30 serves as a first battery pack and the N−1 detachable or attachable battery packs serve as second to $N^{th}$ battery packs.

Among the first to $N^{th}$ battery packs, as described with reference to FIG. 1, the first battery pack has the highest charge priority (a charge priority for ranking based on battery numbers) based on the battery numbers and the $N^{th}$ battery pack has the lowest charge priority.

In the computer system illustrated in FIG. 1, for example, when the AC adapter is connected, the battery packs mounted on the computer system are charged.

That is, in step S71, the battery control unit 52 configured by the software requests the charge information to all of the battery packs mounted on the computer system, that is, the first and $N^{th}$ battery packs, to acquire the charge information. Then, the process proceeds to step S72.

In step S72, the battery control unit 52 sets the battery packs (here, the first to $N^{th}$ battery packs) from which the charge information is acquired as charge target candidates (hereinafter, also referred to as candidate packs). Then, the process proceeds to step S73.

In step S73, the battery control unit 52 excludes the battery packs in which the charge information is "charge disallowance" from the candidate packs based on the charge information acquired in the immediately previously performed step S71. Then, the process proceeds to step S74.

In step S74, based on the charge information acquired in the immediately previously performed step S71, the battery control unit 52 determines whether the candidate packs include the battery pack chargeable at a high speed, that is, the battery pack (the battery pack which has a remaining capacity equal to or less than a capacity threshold value and has a small remaining capacity) in which the charge information is "high-speed charge allowance."

When it is determined in step S74 that the candidate packs include the battery packs chargeable at the high speed, the process proceeds to step S75. The battery control unit 52 determines whether the candidate packs (the battery packs chargeable at the high speed among the candidate packs) chargeable at the high speed include the battery pack 30 serving as the first battery pack.

When it is determined in step S75 that the candidate packs chargeable at the high speed include the first battery pack, the process proceeds to step S76. The battery control unit 52 preferentially selects the first battery pack chargeable at the high speed as a charge target (hereinafter, also referred to as a target pack). Then, the process proceeds to step S81.

Conversely, when it is determined in step S75 that the candidate packs chargeable at the high speed do not include the first battery pack, the process proceeds to step S77. The battery control unit 52 selects, as the target pack, one battery pack among the candidate packs chargeable at the high speed, that is, for example, the battery pack (the candidate pack with the smallest battery number) with the highest charge priority which is based on the battery number among the candidate packs chargeable at the high speed. The process proceeds to step S81.

Conversely, when it is determined in step S74 that the candidate packs do not include the battery packs chargeable at the high speed, that is, the candidate packs include only the battery packs (the battery packs which have the remaining capacity greater than the capacity threshold value and have an abundant remaining capacity) which may not be charged at the high speed, the process proceeds to step S78. The battery control unit 52 determines whether the candidate packs of only the battery packs which may not be charged at the high speed include the battery pack 30 serving as the first battery pack.

When it is determined in step S78 that the candidate packs include the first battery pack, the process proceeds to step S79. The battery control unit 52 preferentially selects the first battery pack as the target pack. Then, the process proceeds to step S81.

Conversely, when it is determined in step S78 that the candidate packs do not include the first battery pack, the process proceeds to step S80. The battery control unit 52 selects, as the target pack, one battery pack among the candidate packs of only the battery packs which may not be charged at the high speed, that is, for example, the battery pack (the candidate pack with the smallest battery number) with the highest charge priority based on the battery number among the candidate packs of only the battery packs which may not be charged at the high speed. Then, the process proceeds to step S81.

In step S81, the battery control unit 52 determines whether the AC adapter is detached.

When it is determined in step S81 that the AC adapter is not detached, the process returns to step S71 and the same process is repeated subsequently.

Conversely, when it is determined in step S81 that the AC adapter is detached, charging of the battery pack (target pack) ends.

As described above, the battery control unit 52 preferentially selects, as the target pack, the battery pack chargeable at the high speed among the chargeable battery packs based on the charge information, and the selected target pack is charged.

When there are the plurality of battery packs chargeable at the high speed, the battery pack with the highest charge priority based on the battery number is preferentially selected as the target pack among the candidate packs chargeable at the high speed and is charged.

When the chargeable battery packs do not include the battery pack chargeable at the high speed, that is, there are only the battery packs which may not be charged at the high speed, the battery packs which may not be charged at the high speed are selected as the target pack in the order of the charge priority based on the battery number and are charged.

Accordingly, as described above, when the battery pack 30 serving as the first battery pack and the N−1 battery packs, the second to $N^{th}$ battery packs, having the same configuration as the battery pack 40 are mounted on the computer system in FIG. 1 and when the chargeable battery packs include the battery packs chargeable at the high speed and the battery packs chargeable at the high speed include the first battery pack serving as a predetermined battery pack, the first battery pack is preferentially selected as the target pack and is charged.

For example, even when the chargeable battery packs include only the battery packs which may not be charged at the high speed and the battery packs which may not be charged at the high speed include the first battery pack, the first battery pack is preferentially selected as the target pack and is charged.

However, when the chargeable battery packs include the first battery pack, but the chargeable battery packs also include the battery packs chargeable at the high speed and the battery packs chargeable at the high speed do not include the first battery pack, that is, the first battery pack is the battery pack which is chargeable but may not be charged at the high speed and the chargeable battery packs include another battery pack chargeable at the high speed, the other battery pack chargeable at the high speed is preferentially selected as the target pack and is charged.

In FIG. 9, the example in which one battery pack is selected as the target pack among the first to $N^{th}$ battery packs and the battery packs are charged one by one has been described. However, according to the specification of the computer system, a plurality of battery packs may be selected as the target packs at once and the plurality of battery packs may be charged simultaneously.

Even in this case, in regard to the plurality of battery packs selected as the target packs, the battery packs chargeable at the high speed are preferentially selected as the target packs.

When the number of battery packs selectable as the target packs at once is assumed to be K and the number of battery packs chargeable at the high speed is greater than K, the battery packs are selected as the target packs up to the $K^{th}$ battery pack in the order of the charge priority which is based on the battery number.

When the number of battery packs chargeable at the high speed is less than K, all of the battery packs chargeable at the high speed which are fewer than K battery packs are selected as the target packs and the battery packs which may not be charged at the high speed are selected within the limit of K target packs as the target packs in the order of the charge priority based on the battery number.

FIG. 10 is a diagram illustrating the battery packs selected as charge targets (target packs) under the control of the charge described with reference to FIG. 9 when the battery packs 30 and 40 are mounted on the computer system in FIG. 1.

Here, when the battery packs 30 and 40 are mounted on the computer system, the battery pack 30 serves as a first battery pack and the battery pack 40 serves as a second battery pack.

Here, one battery pack at a time is assumed to be selected as the target pack.

When the charge information regarding the first battery pack (the battery pack 30) is "charge disallowance" and the charge information regarding the second battery pack (the battery pack 40) is "charge disallowance," neither the first nor the second battery pack is selected as the target pack and charging of the battery pack is not performed.

When the charge information regarding the first battery pack is "high-speed charge allowance" or "high-speed charge disallowance" and the charge information regarding the second battery pack is "charge disallowance," the first battery pack which is chargeable between the first and second battery packs is selected as the target pack.

When the charge information regarding the first battery pack is "charge disallowance" and the charge information regarding the second battery pack is "high-speed charge allowance," the second battery pack which is chargeable between the first and second battery packs is selected as the target pack.

When the charge information regarding the first battery pack is "high-speed charge allowance" and the charge information regarding the second battery pack is "high-speed charge allowance," the first battery pack with the higher charge priority based on the battery number between the first and second battery packs chargeable at the high speed is selected as the target pack.

When the charge information regarding the first battery pack is "high-speed charge disallowance" and the charge information regarding the second battery pack is "high-speed charge allowance," the second battery pack which is chargeable at the high speed between the chargeable first and second battery packs is selected as the target pack.

When the charge information regarding the first battery pack is "charge disallowance" and the charge information regarding the second battery pack is "high-speed charge disallowance," the second battery pack which is chargeable (at the high speed) between the first and second battery packs is selected as the target pack.

When the charge information regarding the first battery pack is "high-speed charge allowance" and the charge information regarding the second battery pack is "high-speed charge disallowance," the first battery pack which is chargeable at the high speed between the chargeable first and second battery packs is selected as the target pack.

When the charge information regarding the first battery pack is "high-speed charge disallowance" and the charge information regarding the second battery pack is "high-speed charge disallowance," the first battery pack which has the higher charge priority based on the battery number between the first and second battery packs which are chargeable but may not be charged at the high speed is selected as the target pack.

Here, in the computer system illustrated in FIG. 1, for example, the battery control unit 52 can periodically acquire the battery information from the battery packs 30 and 40 by the software control and perform the same control of the charge as that described with reference to FIG. 6 based on the remaining capacities of the battery packs 30 and 40 recognized from the battery information.

That is, based on the remaining capacities of the battery packs 30 and 40, the battery control unit 52 can charge the battery packs, until the charge packs are fully charged by preferentially selecting the battery pack which has the remaining capacity equal to or less than the preset capacity threshold value th % and is chargeable at the high speed as the charge target (target pack) one by one between the battery packs 30 and 40 and by sequentially selecting the battery packs 30 and 40 as the target pack after the remaining capacities of both of the battery packs 30 and 40 are greater than the capacity threshold value th %.

In this case, as in the case described with reference to FIG. 6, the efficient charge can be performed.

However, when the target pack is selected based on only the remaining capacities of the battery packs 30 and 40 and, for example, when charging of the target pack is stopped due to protection or the like by a protective circuit in the target pack, there is a concern that the battery pack may be continuously selected as the target pack and another chargeable battery pack may not be charged due to the fact that there is no increase in the remaining capacity of the battery pack which is selected as the target pack and of which the charge is stopped.

On the other hand, in the control of the charge described with reference to FIGS. 9 and 10, since the battery control unit 52 performs the charge control based on the charge information which is output by the battery packs 30 and 40 and indicates whether the charge is possible, it is possible to appropriately perform the charge.

That is, the battery control unit 52 selects the charge target (target pack) based on the charge information which is output by each of the battery packs 30 and 40, indicates whether the charge is possible, and includes information indicating whether high-speed charge is possible. Therefore, at this time, the battery pack chargeable at the high speed is preferentially selected as the target pack and it is possible to perform the efficient charge.

When the charge of the target pack is stopped due to the protection or the like by a protective circuit in the target pack, the charge information regarding the battery pack which is selected as the target pack and of which the charge is stopped is "charge disallowance." As a result, another chargeable battery pack is selected as the target pack and is charged.

Accordingly, as in the case in which the target pack is selected based on only the remaining capacity, there is no increase in the remaining capacity of the battery pack selected as the target pack of which the charge is stopped when the charge of the target pack is stopped due to the protection or the like by the protective circuit in the target pack. Therefore, it is possible to prevent the battery pack from being continuously selected as the target pack and prevent another chargeable battery pack from being charged.

In this specification, processes executed according to programs by processors (the CPU 12 or the microcomputers 32 and 42) may not necessarily be performed chronologically in the order described with reference to the flowcharts. That is, the processes executed according to the programs by the processors include processes (for example, parallel processing or processes by objects) executed in parallel or individually.

It should be understood by those skilled in the art that various modifications, combinations, sub-combinations and alterations may occur depending on design requirements and other factors insofar as they are within the scope of the appended claims or the equivalents thereof.

For example, the battery pack 30 may be configured to output both charge information and discharge information, as in the battery pack 40.

For example, the battery pack 40 may be configured to output only one piece of information rather than both the charge information and the discharge information.

When the battery pack 40 outputs at least the discharge information, it is possible to control the discharge described with reference to FIG. 7. When the battery pack 40 outputs at least the charge information, it is possible to control the charge described with reference to FIGS. 9 and 10.

In FIG. 1, only one of the control of the discharge and the control of the charge of the battery pack can be performed.

In the computer system illustrated in FIG. 1, for example, a large-capacity capacitor or a battery pack other than the battery packs 30 and 40 may be mounted as an auxiliary power source. When the battery pack is switched from the battery pack 40 to the battery pack 30 in the battery driving, the auxiliary power source can be used to drive the computer system.

In this case, even when the battery pack performing the discharge may not instantaneously be switched from the battery pack 40 to the battery pack 30, it is possible to prevent unexpected shutdown of the computer system from occurring. That is, without providing the battery control unit 51 configured by the hardware, it is possible to prevent unexpected shutdown of the computer system from occurring.

In the computer system, a function of detecting that the voltages of the battery packs 30 and 40 (the battery cells of the battery packs 30 and 40) included in the battery information regarding the battery packs 30 and 40 are low voltages and a function of forcibly switching the battery pack performing the discharge to the other battery pack when it is detected that the voltage of the battery pack performing the discharge between the battery packs 30 and 40 is a low voltage may be mounted as hardware to achieve a fast processing speed. In this case, for example, even when the remaining capacity of the battery pack performing the discharge between the battery packs 30 and 40 abruptly becomes 0% due to a sharp increase in load, it is possible to prevent unexpected shutdown of the computer system from occurring.

When a combining circuit that seamlessly combines output powers of the battery packs 30 and 40 and outputs the power is mounted on the computer system and at least one of the battery packs 30 and 40 can output the power the battery driving can be performed.

When the combining circuit is configured to obtain an output of the power at the time of serial or parallel connection of the battery packs 30 and 40, it is possible to drive a load exceeding rating of the single battery pack 30 or 40.

In some cases, the battery control unit 52 switches the battery pack (selects the target pack again) which is the target pack based on the remaining capacity or the current of the target pack recognized from the battery information of the charge target (target pack) between the battery packs 30 and 40.

That is, for example, when the remaining capacity of the target pack does not increase during a given time at the time of the charge, it can be determined that the charge is abnormally stopped by a protective circuit or the like in the battery pack which is the target pack and the target pack can be switched to the battery pack which is not the battery pack which is currently the target pack between the battery packs 30 and 40.

When a current (charge current) flowing in the target pack becomes 0 at the time of the charge in spite of the fact that the target pack is not fully charged, it can be determined that the charge is abnormally stopped by a protective circuit or the like in the battery pack which is the target pack and the target pack can be switched to the battery pack which is not the battery pack which is currently the target pack between the battery packs 30 and 40.

As described above, when the battery pack which is the target pack is switched based on the remaining capacity or the current of the target pack, the upper limit of the number of times the battery pack is switched can be set. In this case, when the charge is abnormally stopped in both of the battery packs 30 and 40, it is possible to prevent the battery pack which is the target pack from being continuously switched.

The electric device according to the embodiment of the present technology is not limited to a computer such as a note-type PC, but the embodiment of the present technology may be applied not only to tablet terminals and digital (video/still) cameras but to all electronic devices on which a battery pack is mounted.

Additionally, the present technology may also be configured as below.

(1)
An electronic device system including:
a plurality of battery packs; and
an electronic device that is driven by a power source supplied from the battery packs,
wherein at least one battery pack of the plurality of battery packs outputs one or both of discharge information indicating whether the battery pack is dischargeable and charge information indicating whether the battery pack is chargeable, and
wherein the electronic device includes a control unit that performs one or both of control of discharge of the battery pack based on the discharge information and control of charge of the battery pack based on the charge information.

(2)
The electronic device system according to (1), wherein the battery pack includes a dedicated port that outputs the discharge information.

(3)
The electronic device system according to (1) or (2), wherein the battery pack outputs the discharge information based on a voltage and a temperature of a battery cell included in the battery pack and a current flowing from the battery cell.

(4)
The electronic device system according to any one of (1) to (3), wherein, based on the discharge information, the control unit selects, when a battery pack other than a predetermined battery pack among the plurality of battery packs is dischargeable, the dischargeable battery pack as the power source, and selects, when the battery pack other than the predetermined battery pack among the plurality of battery packs is not dischargeable, the predetermined battery pack as the power source.

(5)
The electronic device system according to (4),
wherein the predetermined battery pack is a battery pack fixed to the electronic device, and
wherein the battery pack other than the predetermined battery pack is a battery pack detachable from or attachable to the electronic device.

(6)
The electronic device system according to any one of (1) to (5), wherein the charge information includes information indicating whether high-speed charge in which a charge speed is fast is possible.

(7)
The electronic device system according to (6), wherein the battery pack outputs the charge information based on a voltage and a temperature of a battery cell included in the battery pack and a current flowing in the battery cell.

(8)
The electronic device system according to (6) or (7), wherein the battery pack stores a capacity threshold value of a remaining capacity of the battery pack when the high-speed charge is performed on the battery pack, and determines whether the high-speed charge is possible based on the capacity threshold value.

(9)
The electronic device system according to any one of (6) to (8), wherein, based on the charge information, the control unit preferentially selects, as a charge target, a battery pack for which the high-speed charge is possible among chargeable battery packs.

(10)
The electronic device system according to (9), wherein the control unit preferentially selects a predetermined battery pack as the charge target when the predetermined battery pack is included in battery packs for which the high-speed charge is possible or when the chargeable battery packs are only battery packs for which the high-speed charge is not possible and the predetermined battery pack is included in the battery packs for which the high-speed charge is not possible.

(11)
The electronic device system according to (10),
wherein the predetermined battery pack is a battery pack fixed to the electronic device, and
wherein a battery pack other than the predetermined battery pack is a battery pack detachable from or attachable to the electronic device.

(12)
The electronic device system according to any one of (1) to (11),
wherein a first control unit configured as hardware and a second control unit configured as software are included as the control unit,
wherein the first control unit performs the control of the discharge of the battery pack, and
wherein the second control unit performs the control of the charge of the battery pack.

(13)
A battery pack that outputs charge information indicating whether charge is possible.

(14)
The battery pack according to (13), wherein the charge information includes information indicating whether high-speed charge in which a charge speed is fast is possible.

(15)
The battery pack according to (14), wherein the battery pack outputs the charge information based on a voltage and a temperature of a battery cell included in the battery pack and a current flowing in the battery cell.

(16)
The battery pack according to (14) or (15), wherein the battery pack stores a capacity threshold value of a remaining capacity of the battery pack when the high-speed charge is performed on the battery pack, and determines whether the high-speed charge is possible based on the capacity threshold value.

(17)
A battery pack that outputs discharge information indicating whether discharge is possible.

(18)
The battery pack according to (17), wherein the battery pack includes a dedicated port that outputs the discharge information.

(19)
The battery pack according to (17) or (18), wherein the battery pack outputs the discharge information based on a voltage and a temperature of a battery cell included in the battery pack and a current flowing from the battery cell.

(20)
The battery pack according to any one of (17) to (19), wherein the battery pack further outputs charge information indicating whether charge is possible.

(21)
The battery pack according to (20), wherein the charge information includes information indicating whether high-speed charge in which a charge speed is fast is possible.

(22)
The battery pack according to (21), wherein the battery pack outputs the charge information based on a voltage and a temperature of a battery cell included in the battery pack and a current flowing in the battery cell.

(23)
The battery pack according to (21) or (22), wherein the battery pack stores a capacity threshold value of a remaining capacity of the battery pack when the high-speed charge is performed on the battery pack, and determines whether the high-speed charge is possible based on the capacity threshold value.

The present disclosure contains subject matter related to that disclosed in Japanese Priority Patent Application JP 2012-184851 filed in the Japan Patent Office on Aug. 24, 2012, the entire content of which is hereby incorporated by reference.

What is claimed is:

1. An electronic device system comprising:
a plurality of battery packs; and
an electronic device that is driven by a power source supplied from the battery packs,
wherein at least one battery pack of the plurality of battery packs outputs, to the electronic device upon a request made by the electronic device to the at least one battery pack for information, one or both of discharge information indicating whether the battery pack is dischargeable and charge information indicating whether the battery pack is chargeable, and
wherein the electronic device includes a control unit that performs one or both of control of discharge of the battery pack based on the outputted discharge information that has been received by the electronic device and control of charge of the battery pack based on the outputted charge information that has been received by the electronic device.

2. The electronic device system according to claim 1, wherein the battery pack includes a dedicated port that outputs the discharge information.

3. The electronic device system according to claim 2, wherein the battery pack outputs the discharge information based on a voltage and a temperature of a battery cell included in the battery pack and a current flowing from the battery cell.

4. The electronic device system according to claim 2, wherein, based on the discharge information, the control unit selects, when a battery pack other than a predetermined battery pack among the plurality of battery packs is dischargeable, the dischargeable battery pack as the power source, and selects, when the battery pack other than the predetermined battery pack among the plurality of battery packs is not dischargeable, the predetermined battery pack as the power source.

5. The electronic device system according to claim 4,
wherein the predetermined battery pack is a battery pack fixed to the electronic device, and
wherein the battery pack other than the predetermined battery pack is a battery pack detachable from or attachable to the electronic device.

6. The electronic device system according to claim 2, wherein the charge information includes information indicating whether high-speed charge in which a charge speed is fast is possible.

7. The electronic device system according to claim 6, wherein the battery pack outputs the charge information based on a voltage and a temperature of a battery cell included in the battery pack and a current flowing in the battery cell.

8. The electronic device system according to claim 6, wherein the battery pack stores a capacity threshold value of a remaining capacity of the battery pack when the high-speed charge is performed on the battery pack, and determines whether the high-speed charge is possible based on the capacity threshold value.

9. The electronic device system according to claim 6, wherein, based on the charge information, the control unit preferentially selects, as a charge target, a battery pack for which the high-speed charge is possible among chargeable battery packs.

10. The electronic device system according to claim 9, wherein the control unit preferentially selects a predetermined battery pack as the charge target when the predetermined battery pack is included in battery packs for which the high-speed charge is possible or when the chargeable battery packs are only battery packs for which the high-speed charge is not possible and the predetermined battery pack is included in the battery packs for which the high-speed charge is not possible.

11. The electronic device system according to claim 10,
wherein the predetermined battery pack is a battery pack fixed to the electronic device, and
wherein a battery pack other than the predetermined battery pack is a battery pack detachable from or attachable to the electronic device.

12. The electronic device system according to claim 2,
wherein a first control unit configured as hardware and a second control unit configured as software are included as the control unit,
wherein the first control unit performs the control of the discharge of the battery pack, and
wherein the second control unit performs the control of the charge of the battery pack.

13. The electronic device system according to claim 1, wherein the control unit is implemented via at least one processor of the electronic device system.

14. The electronic device system according to claim 1, wherein each one of the plurality of battery packs outputs one or both of discharge information indicating whether the respective battery pack is dischargeable and charge information indicating whether the respective battery pack is chargeable, and wherein the control unit performs the one or both of control of discharge and control of charge of each one of the plurality of battery packs.

15. The electronic device system according to claim 1, wherein the control unit performs the one or both of control of discharge and control of charge of each one of the plurality of battery packs.

16. The electronic device system according to claim 1, wherein the at least one battery pack of the plurality of battery packs outputs both of the discharge information indicating whether the battery pack is dischargeable and the charge information indicating whether the battery pack is chargeable.

17. The electronic device system according to claim 16, wherein the control unit performs both control of discharge of the battery pack based on the discharge information and control of charge of the battery pack based on the charge information.

18. A battery pack that outputs charge information indicating whether charge is possible,
wherein the charge information is output to an electronic device that is driven by a power source supplied by the battery pack, upon a request made by the electronic device to the battery pack for the charge information.

19. The battery pack according to claim 18, wherein the charge information includes information indicating whether high-speed charge in which a charge speed is fast is possible.

20. The battery pack according to claim 19, wherein the battery pack outputs the charge information based on a voltage and a temperature of a battery cell included in the battery pack and a current flowing in the battery cell.

21. The battery pack according to claim 19, wherein the battery pack stores a capacity threshold value of a remaining capacity of the battery pack when the high-speed charge is performed on the battery pack, and determines whether the high-speed charge is possible based on the capacity threshold value.

22. A battery pack that outputs discharge information indicating whether discharge is possible,
wherein the discharge information is output to an electronic device that is driven by a power source supplied by the battery pack, upon a request made by the electronic device to the battery pack for the discharge information.

23. The battery pack according to claim 22, wherein the battery pack includes a dedicated port that outputs the discharge information.

24. The battery pack according to claim 23, wherein the battery pack outputs the discharge information based on a voltage and a temperature of a battery cell included in the battery pack and a current flowing from the battery cell.

25. The battery pack according to claim 23, wherein the battery pack further outputs charge information indicating whether charge is possible.

26. The battery pack according to claim 25, wherein the charge information includes information indicating whether high-speed charge in which a charge speed is fast is possible.

27. The battery pack according to claim 26, wherein the battery pack outputs the charge information based on a voltage and a temperature of a battery cell included in the battery pack and a current flowing in the battery cell.

28. The battery pack according to claim 26, wherein the battery pack stores a capacity threshold value of a remaining capacity of the battery pack when the high-speed charge is performed on the battery pack, and determines whether the high-speed charge is possible based on the capacity threshold value.

* * * * *